(12) United States Patent
Zhou et al.

(10) Patent No.: US 11,888,154 B2
(45) Date of Patent: Jan. 30, 2024

(54) POSITIVE ELECTRODE SHEET, SECONDARY BATTERY, BATTERY MODULE, BATTERY PACK AND ELECTRICAL APPARATUS

(71) Applicant: CONTEMPORARY AMPEREX TECHNOLOGY CO., LIMITED, Fujian (CN)

(72) Inventors: Xiang Zhou, Fujian (CN); Jiang Liu, Fujian (CN); Baiqing Li, Fujian (CN); Yao Jiang, Fujian (CN); Xiaomei Liu, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/211,591

(22) Filed: Jun. 20, 2023

(65) Prior Publication Data
US 2023/0352663 A1    Nov. 2, 2023

Related U.S. Application Data

(63) Continuation of application No. PCT/CN2022/079269, filed on Mar. 4, 2022.

(51) Int. Cl.
| | |
|---|---|
| *H01M 4/36* | (2006.01) |
| *H01M 4/505* | (2010.01) |
| *H01M 4/58* | (2010.01) |
| *H01M 4/525* | (2010.01) |
| *H01M 4/583* | (2010.01) |
| *H01M 4/02* | (2006.01) |
| *H01M 10/052* | (2010.01) |

(52) U.S. Cl.
CPC .......... *H01M 4/366* (2013.01); *H01M 4/505* (2013.01); *H01M 4/525* (2013.01); *H01M 4/583* (2013.01);
(Continued)

(58) Field of Classification Search
None
See application file for complete search history.

(56) References Cited

U.S. PATENT DOCUMENTS

| | | | |
|---|---|---|---|
| 2014/0186714 A1* | 7/2014 | Kamimura | C01B 25/45 429/231.95 |
| 2016/0049645 A1* | 2/2016 | Zheng | H01M 4/505 429/223 |

(Continued)

FOREIGN PATENT DOCUMENTS

| | | |
|---|---|---|
| CN | 105261740 A | 1/2016 |
| CN | 105406069 A | 3/2016 |

(Continued)

OTHER PUBLICATIONS

International Search Report dated Nov. 25, 2022, received for PCT Application PCT/CN2022/079269, filed on Mar. 4, 2022, 6 pages including English Translation.

(Continued)

*Primary Examiner* — Scott J. Chmielecki
(74) *Attorney, Agent, or Firm* — XSENSUS LLP

(57) ABSTRACT

A positive electrode sheet may comprise a positive electrode current collector and a positive electrode film layer having a single-layer structure or a multi-layer structure provided on at least one surface thereof; when the positive electrode film layer is of a single-layer structure, at least one positive electrode film layer may comprise both a first positive electrode active material and a second positive electrode active material; and/or, when the positive electrode film layer is of a multi-layer structure, at least one layer of the at least one positive electrode film layer may comprise both a first positive electrode active material and a second positive electrode active material; the first positive electrode active material may comprises an inner core containing $Li_{1+x}Mn_{1-y}A_yP_{1-z}R_zO_4$, a first coating layer containing pyrophosphate (Continued)

$MP_2O_7$ and phosphate $XPO_4$ and covering the inner core, and a second coating layer containing carbon element and covering the first coating layer.

19 Claims, 10 Drawing Sheets

(52) U.S. Cl.
CPC ........ *H01M 4/5825* (2013.01); *H01M 10/052* (2013.01); *H01M 2004/028* (2013.01); *H01M 2220/20* (2013.01)

(56) References Cited

U.S. PATENT DOCUMENTS

| | | | |
|---|---|---|---|
| 2023/0268586 A1* | 8/2023 | Sun | H01M 10/6555 429/120 |
| 2023/0268588 A1* | 8/2023 | Sun | H01M 10/6568 429/120 |

FOREIGN PATENT DOCUMENTS

| | | |
|---|---|---|
| CN | 108598383 A | 9/2018 |
| CN | 109301174 A | 2/2019 |
| CN | 111276693 A | 6/2020 |
| CN | 111933915 A | 11/2020 |
| CN | 112864360 A | 5/2021 |
| CN | 108666545 B | 6/2021 |
| CN | 109473675 B | 8/2021 |
| CN | 113224278 A | 8/2021 |
| CN | 113270575 A | 8/2021 |

OTHER PUBLICATIONS

Written Opinion of the International Searching Authority dated Nov. 25, 2022, received for PCT Application PCT/CN2022/079269, filed on Mar. 4, 2022, 7 pages including English Translation.

* cited by examiner

POSITIVE ELECTRODE SHEET, SECONDARY BATTERY, BATTERY MODULE, BATTERY PACK AND ELECTRICAL APPARATUS

CROSS-REFERENCE TO RELATED APPLICATION

The present application is a continuation of International Application No. PCT/CN2022/079269, filed Mar. 4, 2022, which is incorporated herein by reference in its entirety.

TECHNICAL FIELD

The present application relates to the technical field of secondary batteries, and in particular to a positive electrode sheet, a secondary battery, a battery module, a battery pack and an electrical apparatus.

BACKGROUND

In recent years, with the increasingly wide use of secondary batteries, secondary batteries are widely used in energy storage power systems such as water power, thermal power, wind power and solar power stations, as well as power tools, electric bicycles, electric motorcycles, electric vehicles, military equipment, aerospace and other fields. Due to the great development of secondary batteries, higher requirements have also been put forward for their energy density, cycling performance and safety performance. A secondary battery is made by admixing the existing lithium manganese iron phosphate as a main material with ternary materials such as lithium nickel cobalt manganate, lithium nickel cobalt aluminate or lithium cobalt oxide. Although this technology combines the respective advantages of lithium manganese iron phosphate and ternary materials, lithium manganese iron phosphate makes the dynamic performance of the battery poor, and the rate performance of battery cell is lower, which cannot meet the demand for power batteries.

SUMMARY OF THE DISCLOSURE

The present application has been made in view of the above-mentioned problems, and an object thereof is to provide a positive electrode sheet, a secondary battery, a battery module, a battery pack and an electrical apparatus, so as to solve the problems of low energy density, low battery cell rate performance, poor dynamic performance, poor low temperature performance, short cycle life and low safety of the secondary battery made with the existing positive electrode active materials.

In order to achieve the above object, a first aspect of the present application provides a positive electrode sheet comprising a positive electrode current collector and a positive electrode film layer provided on at least one surface of the positive electrode current collector; the positive electrode film layer is of a single-layer structure or a multi-layer structure; when the positive electrode film layer is of a single-layer structure, at least one positive electrode film layer comprises both a first positive electrode active material having a core-shell structure and a second positive electrode active material; and/or, when the positive electrode film layer is of a multi-layer structure, at least one layer of the at least one positive electrode film layer comprises both a first positive electrode active material having a core-shell structure and a second positive electrode active material; the first positive electrode active material comprises an inner core, a first coating layer covering the inner core and a second coating layer covering the first coating layer; wherein the inner core comprises $Li_{1+x}Mn_{1-y}A_yP_{1-z}R_zO_4$, the first coating layer comprises pyrophosphate $MP_2O_7$ and phosphate $XPO_4$, and the second coating layer comprises carbon element; wherein A is selected from one or more elements of Zn, Al, Na, K, Mg, Mo, W, Ti, V, Zr, Fe, Ni, Co, Ga, Sn, Sb, Nb and Ge; R is selected from one or more elements of B, Si, N and S; x is selected from any value in the range of −0.100-0.100; y is selected from any value in the range of 0.001-0.500, z is selected from any value in the range of 0.001-0.100; M and X are independently selected from one or more elements of Li, Fe, Ni, Mg, Co, Cu, Zn, Ti, Ag, Zr, Nb and Al; and the second positive electrode active material is selected from one or more of $LiNi_aCo_bMn_{(1-a-b)}O_2$, $LiNi_aCo_bAl_{(1-a-b)}O_2$ and $LiCoO_2$; wherein a is independently selected from any value in the range of 0.3-0.9 (optionally 0.33-0.8), and the sum of a and b is independently selected from any value in the range of 0.3-0.9 (optionally 0.66-0.9).

Thus, the applicant has unexpectedly found that by doping a specific element in a specific amount at the Mn position and the P position of the compound $LiMnPO_4$ at the same time and coating the compound surface with two layers to obtain the first positive electrode active material, the dissolution of transition metals can be greatly reduced, the oxygen activity on the particle surface can be reduced, the migration of lithium ions can be promoted, the conductivity and desolvation performance of the material can be improved, the rate performance of the battery can be improved, the cycling performance and high temperature performance of the secondary battery can be improved, and the corrosion of the active material by electrolyte solution can be reduced.

According to the present application, the first positive electrode active material and the second positive electrode active material are mixed for use, so that the advantages of the two materials are complementary, the energy density of the secondary battery is improved, and the battery simultaneously has excellent rate performance, dynamic performance, cycling performance, low temperature performance and safety. The particles of the first positive electrode active material are uniformly coated on the surface of the second positive electrode active material, so that the crystal lattice of the second positive electrode active material is relatively independent and the skeleton is stable, and it is not easy to collapse during the charging and discharging processes of the secondary battery, which further improves the cycle life of the battery; and in addition, the coating layer formed by the first positive electrode active material provides elastic strain force for external force impact or shearing, effectively solving the safety problem of the second positive electrode active material.

A second aspect of the present application further provides a positive electrode sheet comprising a positive electrode current collector and a positive electrode film layer provided on at least one surface of the positive electrode current collector; at least one positive electrode film layer is of a multi-layer structure, and any positive electrode film layer having a multi-layer structure respectively comprises a first positive electrode active material having a core-shell structure and a second positive electrode active material in different layers; the first positive electrode active material comprises an inner core, a first coating layer covering the inner core and a second coating layer covering the first coating layer; wherein the inner core comprises $Li_{1+x}Mn_{1-y}A_yP_{1-z}R_zO_4$, the first coating layer comprises pyrophosphate $MP_2O_7$ and phosphate $XPO_4$, and the second coating layer comprises carbon element; wherein A is selected from one or more elements of Zn, Al, Na, K, Mg, Mo, W, Ti, V, Zr, Fe, Ni, Co, Ga, Sn, Sb, Nb and Ge; R is selected from one or more elements of B, Si, N and S; x is selected from −0.100-0.100; y is selected from 0.001-0.500; z is selected from 0.001-0.100; M and X are independently selected from one or more elements of Li, Fe, Ni, Mg, Co, Cu, Zn, Ti, Ag, Zr, Nb and Al; and the second positive electrode active material is selected from one or more of $LiNi_aCo_bMn_{(1-a-b)}O_2$, $LiNi_aCo_bAl_{(1-a-b)}O_2$ and $LiCoO_2$, wherein a is independently selected from any value in the range of 0.3-0.9 (optionally 0.33-0.8), and the sum of a and b is independently selected from any value in the range of 0.3-0.9 (optionally 0.66-0.9); and optionally any positive electrode film layer having a multi-layer structure respectively comprises the first positive electrode active material and the second positive electrode active material in adjacent layers.

Thus, the first positive electrode active material can greatly reduce the dissolution of transition metals and reduce the oxygen activity on the particle surface, promote the migration of lithium ions, improve the conductivity and desolvation performance, improve the rate performance of the battery, and improve the cycling performance and high temperature performance of the secondary battery while reducing the corrosion of the active material by electrolyte solution.

According to the present application, the first positive electrode active material and the second positive electrode active material are used in combination, so that the advantages of the two materials are complementary, the energy density of the secondary battery is improved, and the battery simultaneously has excellent rate performance, dynamic performance, cycling performance and low temperature performance; and moreover, the first positive electrode active material provides elastic strain force for external force impact or shearing, effectively solving the safety problem of the second positive electrode active material.

A third aspect of the present application further provides a positive electrode sheet comprising a positive electrode current collector as well as a positive electrode film layer A and a positive electrode film layer B respectively provided on both surfaces of the positive electrode current collector; the positive electrode film layer A and the positive electrode film layer B are each independently of a single-layer structure or a multi-layer structure; at least one layer of the positive electrode film layer A comprises a first positive electrode active material having a core-shell structure, while at least one layer of the positive electrode film layer B comprises a second positive electrode active material; the first positive electrode active material comprises an inner core, a first coating layer covering the inner core and a second coating layer covering the first coating layer; wherein the inner core comprises $Li_{1+x}Mn_{1-y}A_yP_{1-z}R_zO_4$, the first coating layer comprises pyrophosphate $MP_2O_7$ and phosphate $XPO_4$, and the second coating layer comprises carbon element; wherein A is selected from one or more elements of Zn, Al, Na, K, Mg, Mo, W, Ti, V, Zr, Fe, Ni, Co, Ga, Sn, Sb, Nb and Ge; R is selected from one or more elements of B, Si, N and S; x is selected from −0.100-0.100; y is selected from 0.001-0.500; z is selected from 0.001-0.100; M and X are independently selected from one or more elements of Li, Fe, Ni, Mg, Co, Cu, Zn, Ti, Ag, Zr, Nb and Al; and the second positive electrode active material is selected from one or more of $LiNi_aCo_bMn_{(1-a-b)}O_2$, $LiNi_aCo_bAl_{(1-a-b)}O_2$ and $LiCoO_2$, wherein a is independently selected from any value in the range of 0.3-0.9 (optionally 0.33-0.8), and the sum of a and b is independently selected from any value in the range of 0.3-0.9 (optionally 0.66-0.9).

Thus, the first positive electrode active material can greatly reduce the dissolution of transition metals and reduce the oxygen activity on the particle surface, promote the migration of lithium ions, improve the conductivity and desolvation performance, improve the rate performance of the battery, and improve the cycling performance and high temperature performance of the secondary battery while reducing the corrosion of the active material by electrolyte solution.

According to the present application, the first positive electrode active material and the second positive electrode active material are used in combination, so that the advantages of the two materials are complementary, the energy density of the secondary battery is improved, and the battery simultaneously has excellent rate performance, dynamic performance, cycling performance and low temperature performance; and moreover, the first positive electrode active material provides elastic strain force for external force impact or shearing, effectively solving the safety problem of the second positive electrode active material.

Unless otherwise specified, in the above chemical formula, when A is two or more elements, the above limitation on the numerical range of y is not only a limitation on the stoichiometric number of each element as A, but also a limitation on the sum of the stoichiometric numbers of each element as A. For example, when A is two or more elements A1, A2 . . . An, each of the stoichiometric numbers y1, y2 . . . yn for each of A1, A2 . . . An is required to fall within the numerical range defined for y in the present application, and the sum of y1, y2 . . . yn is also required to fall within this numerical range. Similarly, for the case where R is two or more elements, the limitation on the numerical range of the stoichiometric number of R in the present application also has the above-mentioned meaning.

In any of the embodiments of the first to third aspects, the mass ratio of the first active material to the second active material is 1:7-7:1, optionally 1:4-4:1. This ensures that the secondary battery has both excellent rate performance and cycling performance, as well as high energy density, excellent dynamic performance and low temperature performance, the interfacial side reactions are reduced, and the safety of the secondary battery is improved.

In any of the embodiments of the first to third aspects, in the first positive electrode active material, A is selected from one or more elements of Zn, Fe, Ti, V, Ni, Co and Mg; and/or, A is selected from at least two elements of Fe, Ti, V, Ni, Co and Mg. By selecting the doping elements within the above-mentioned range, it is favorable for enhancing the doping effect. On the one hand, the lattice change rate is further reduced, so that the dissolution of manganese is suppressed, and the consumption of electrolyte solution and active lithium is reduced, and on the other hand, it is also favorable for further reducing the surface oxygen activity and reduce the interfacial side reactions between the positive electrode active material and the electrolyte solution, so that the cycling performance and high temperature storage performance of the battery are improved.

In any of the embodiments of the first to third aspects, x is selected from any value in the range of −0.100-0.006. By selecting the value of x in this range, the dynamic performance of the first positive electrode active material can be further improved.

In any of the embodiments of the first to third aspects, y is selected from any value in the range of 0.1-0.4. By selecting the value of y in this range, the gram capacity and rate performance of the first positive electrode active material can be further improved.

In any of the embodiments of the first to third aspects, M and X are independently selected from one or more elements of Li and Fe.

In any of the embodiments of the first to third aspects, the ratio of y to 1−y is selected from 1:10 to 10:1, optionally 1:4 to 1:1. Here, y represents the sum of the stoichiometric numbers of doping elements at the position of Mn. When the above conditions are satisfied, the energy density and cycling performance of the secondary battery made of the positive electrode sheet can be further improved.

In any of the embodiments of the first to third aspects, the ratio of z to 1−z is selected from 1:999 to 1:9, optionally 1:499 to 1:249. Here, z represents the sum of the stoichiometric numbers of doping elements at the position of P. When the above conditions are satisfied, the energy density and cycling performance of the secondary battery made of the positive electrode sheet can be further improved.

In any of the embodiments of the first to third aspects, in the first positive electrode active material, the phosphate in the first coating layer has an interplanar spacing of 0.345-0.358 nm and an included angle of crystallographic direction (111) of 24.25°-26.45°; and the pyrophosphate in the first coating layer has an interplanar spacing of 0.293-0.326 nm and an included angle of crystallographic direction (111) of 26.41°-32.57°.

When the interplanar spacings and included angles of crystallographic direction (111) of the phosphate and pyrophosphate in the first coating layer are within the above range, the impurity phases in the coating layer can be effectively avoided, thereby increasing the gram capacity of the material and improving the cycling performance and rate performance of the secondary battery.

In any of the embodiments of the first to third aspects, in the first positive electrode active material, the coating amount of the first coating layer is greater than 0 wt % and less than or equal to 7 wt %, optionally 4-5.6 wt %, based on the weight of the inner core.

When the coating amount of the first coating layer is within the above range, it is possible to further suppress manganese dissolution while further promoting transport of lithium ions. Also the following situations can be effectively avoided: if the coating amount of the first coating layer is too small, the suppression effect of pyrophosphate on manganese dissolution may be insufficient, and at the same time, the lithium ion transport performance is not significantly improved; and if the coating amount of the first coating layer is too large, it may cause the coating layer to be too thick, increasing the battery impedance, and affecting the dynamic performance of the battery.

In any of the embodiments of the first to third aspects, in the first positive electrode active material, the weight ratio of the pyrophosphate to phosphate in the first coating layer is 1:3 to 3:1, optionally 1:3 to 1:1.

A suitable proportion of pyrophosphate and phosphate is favorable for the full synergistic effect of the two. Also the following situations can be effectively avoided: If there is too much pyrophosphate and too little phosphate, the battery impedance may increase; and if there is too much phosphate and too little pyrophosphate, manganese dissolution is not significantly suppressed.

In any of the embodiments of the first to third aspects, in the first positive electrode active material, the crystallinities of the pyrophosphate and phosphate are each independently 10% to 100%, optionally 50% to 100%.

In the first coating layer of the lithium manganese phosphate positive electrode active material of the present application, the pyrophosphate and phosphate with certain crystallinities are favorable for maintaining the structural stability of the first coating layer and reducing lattice defects. On the one hand, this is favorable for the pyrophosphate to fully hinder the dissolution of manganese, and on the other hand, it is also favorable for the phosphate to reduce the content of lithium impurities on the surface and reduce the valence state of oxygen on the surface, thereby reducing the interfacial side reactions between the positive electrode material and the electrolyte solution, reducing the consumption of the electrolyte solution, and improving the cycling performance and safety performance of the secondary battery.

In any of the embodiments of the first to third aspects, in the first positive electrode active material, the coating amount of the second coating layer is greater than 0 wt % and less than or equal to 6 wt %, optionally 3-5 wt %, based on the weight of the inner core.

On the one hand, the carbon-containing layer as the second coating layer can function as a "barrier" to avoid the direct contact between the first positive electrode active material and the electrolyte solution, thus reducing the corrosion of the active material by the electrolyte solution, and improving the safety performance of the battery at high temperatures. On the other hand, it has strong electrical conductivity, which can reduce the internal resistance of the battery, thus improving the dynamic performance of the secondary battery. However, since the gram capacity of carbon material is relatively low, when the amount of the second coating layer is too large, the overall gram capacity of the positive electrode active material may be reduced. Therefore, when the coating amount of the second coating layer is in the above range, the dynamic performance and safety performance of the secondary battery can be further improved without sacrificing the gram capacity of the positive electrode active material.

In any of the embodiments of the first to third aspects, the concentration of Li/Mn antisite defects in the first positive electrode active material is 4% or less, optionally 2% or less. In the first positive electrode active material of the present application, the Li/Mn antisite defect refers to the position interchange of $Li^+$ and $Mn^{2+}$ in the $LiMnPO_4$ lattice. Since $Li^+$ transport channel is a one-dimensional channel, $Mn^{2+}$ is difficult to migrate in the $Li^+$ transport channel, the antisite defective $Mn^{+2}$ will hinder the transport of $Li^+$. By controlling the concentration of Li/Mn antisite defects at a low level, the gram capacity and rate performance of $LiMnPO_4$ can be improved.

In any of the embodiments of the first to third aspects, the lattice change rate of the first positive electrode active material is 6% or less, optionally 4% or less. The lithium deintercalation process of $LiMnPO_4$ is a two-phase reaction. The interfacial stress between two phases is determined by the lattice change rate; the smaller the lattice change rate is, the smaller the interfacial stress is, and the easier $Li^+$ transports. Therefore, reducing the lattice change rate of the inner core will be favorable for enhancing the transport of $Li^+$, thereby improving the rate performance of the secondary battery.

In any of the embodiments of the first to third aspects, the surface oxygen valence state of the first positive electrode active material is −1.88 or less, optionally −1.98~−1.88. This is because that the higher the valence state of oxygen in the compound is, the stronger ability to obtain electrons it has, that is, the more oxidizing it is. In the first positive electrode active material of the present application, by controlling the surface valence state of oxygen at a relatively low level, the reactivity of the surface of the positive electrode material can be reduced, and the interfacial side reactions between the positive electrode material and the electrolyte solution can be reduced, thereby improving the cycling performance and high temperature storage performance of the secondary battery.

In any of the embodiments of the first to third aspects, the compaction density of the first positive electrode active material at 3 tons (T) is 2.0 g/cm$^3$ or more, optionally 2.2 g/cm$^3$ or more.

The higher the compaction density of the first positive electrode active material is, that is, the greater the weight of the active material per unit volume is, the more favorable for increasing the volumetric energy density of the secondary battery it will be.

In any of the embodiments of the first to third aspects, the sum of the masses of the first positive electrode active material and the second positive electrode active material accounts for 88%-98.7% of the mass of the positive electrode sheet. It is further ensured that the secondary battery has excellent rate performance, dynamic performance, cycling performance and low temperature performance, and has higher energy density.

A fourth aspect of the present application provides a secondary battery comprising the positive electrode sheet according to any one of the first to third aspects of the present application.

A fifth aspect of the present application provides a battery module comprising the secondary battery according to the fourth aspect of the present application.

A sixth aspect of the present application provides a battery pack comprising the battery module according to the fifth aspect of the present application.

A seventh aspect of the present application provides an electrical apparatus comprising at least one selected from the secondary battery according to the fourth aspect of the present application, the battery module according to the fifth aspect of the present application, and the battery pack according to the sixth aspect of the present application.

DESCRIPTION OF REFERENCE NUMERALS

Figure 1:
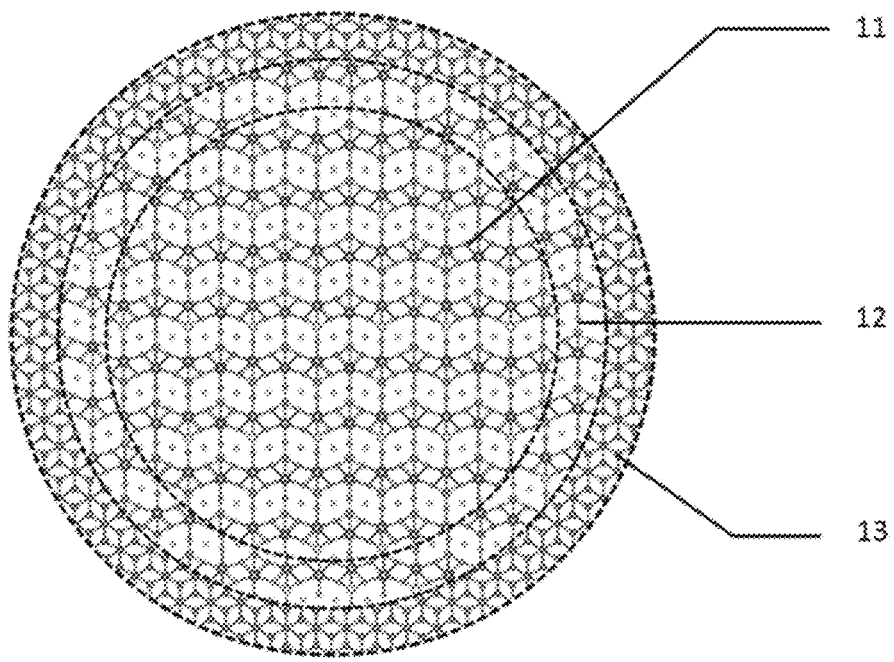
FIG. 1 is a schematic view of a first positive electrode active material having a core-shell structure according to an embodiment of the present application.

1 Battery pack; 2 Upper box body; 3 Lower box body; 4 Battery module; 5 Secondary battery; 51 Case; 52 Electrode assembly; 53 Top cover assembly; 11 Inner core; 12 First coating layer; 13 Second coating layer.

DETAILED DESCRIPTION

Hereinafter, embodiments of the positive electrode sheet, secondary battery, battery module, battery pack and electrical apparatus of the present application are specifically disclosed in detail with appropriate reference to the accompanying drawings. However, there are cases where unnecessary detailed descriptions are omitted. For example, there are cases where detailed descriptions of well-known items and repeated descriptions of actually identical structures are omitted. This is to avoid unnecessary redundancy in the following descriptions and to facilitate the understanding by those skilled in the art. In addition, the drawings and subsequent descriptions are provided for those skilled in the art to fully understand the present application, and are not intended to limit the subject matter recited in the claims.

The "range" disclosed in the present application is defined in terms of lower and upper limits, and a given range is defined by selecting a lower limit and an upper limit, which define the boundaries of a particular range. A range defined in this manner may be inclusive or exclusive of end values, and may be arbitrarily combined, that is, any lower limit may be combined with any upper limit to form a range. For example, if ranges of 60-120 and 80-110 are listed for a particular parameter, it is understood that ranges of 60-110 and 80-120 are also expected. Additionally, if the minimum range values 1 and 2 are listed, and if the maximum range values 3, 4 and 5 are listed, the following ranges are all contemplated: 1-3, 1-4, 1-5, 2-3, 2-4 and 2-5. In the present application, unless stated otherwise, the numerical range "a-b" represents an abbreviated representation of any combination of real numbers between a to b, wherein both a and b are real numbers. For example, the numerical range "0-5" means that all real numbers between "0-5" have been listed herein, and "0-5" is just an abbreviated representation of the combination of these numerical values. Additionally, when it is stated that a certain parameter is an integer of ≥2, it is equivalent to disclosing that the parameter is, for example, an integer of 2, 3, 4, 5, 6, 7, 8, 9, 10, 11, 12, etc.

Unless otherwise specified, all embodiments and optional embodiments of the present application may be combined with each other to form new technical solutions.

Unless otherwise specified, all technical features and optional technical features of the present application may be combined with each other to form new technical solutions.

If not specifically stated, all steps of the present application may be performed sequentially or randomly, preferably sequentially. For example, the method comprises steps (a) and (b), indicating that the method may include steps (a) and (b) performed sequentially, or may include steps (b) and (a) performed sequentially. For example, when it is mentioned that the method can also include step (c), it means that step (c) can be added to the method in any order. For example, the method can include steps (a), (b), and (c), or steps (a), (c), and (b), or steps (c), (a), and (b).

If not specifically stated, "comprising" and "containing" mentioned in the present application indicate open inclusion or closed inclusion. For example, "comprising" and "containing" may indicate that other components not listed may also be included or contained, or only the listed components may be included or contained.

If not specifically stated, the term "or" is inclusive in the present application. By way of example, the phrase "A or B" means "A, B, or both A and B". More specifically, the condition "A or B" is satisfied by any of the following: A is true (or present) and B is false (or absent); A is false (or absent) and B is true (or present); or both A and B are true (or present).

In the present application, if not specified otherwise, a median particle diameter $Dv_{50}$ refers to the corresponding particle diameter when the cumulative volume distribution percentage of the positive electrode active material reaches 50%. In the present application, the median particle diameter $Dv_{50}$ of the positive electrode active material can be determined by laser diffraction particle size analysis. For example, with reference to the standard GB/T 19077-2016, a laser particle size analyzer (such as Malvern Master Size 3000) is used for determination.

In the present application, if not specified otherwise, the term "coating layer" refers to a material layer coated on the inner core, the material layer may completely or partially cover the inner core, the use of "coating layer" is only for convenience of description, and is not intended to limit the present disclosure. Likewise, the term "thickness of the coating layer" refers to the thickness of the material layer coated on the inner core in the radial direction of the inner core.

In the present application, if not specified otherwise, the term "source" refers to a compound as the source of a certain element, and by way of examples, the types of "source" include, but are not limited to, carbonate, sulfate, nitrate, elemental substance, halide, oxide and hydroxide, etc.

[Secondary Battery]

Secondary batteries, also known as rechargeable batteries or storage batteries, refer to batteries that, after being discharged, can activate active materials by charging for continuous use.

Typically, a secondary battery comprises a positive electrode sheet, a negative electrode sheet, a separator and an electrolyte solution. During charging and discharging of the battery, active ions (such as lithium ions) are intercalated and deintercalated back and forth between the positive electrode sheet and the negative electrode sheet. The separator is provided between the positive electrode sheet and the negative electrode sheet, and mainly functions to prevent a short circuit between the positive electrode and the negative electrode while allowing active ions to pass through. The electrolyte solution is between the positive electrode sheet and the negative electrode sheet, and mainly serves to conduct active ions.

[Positive Electrode Sheet]

An embodiment of the first aspect of the present application provides a positive electrode sheet comprising a positive electrode current collector and a positive electrode film layer provided on at least one surface of the positive electrode current collector; the positive electrode film layer is of a single-layer structure or a multi-layer structure; when the positive electrode film layer is of a single-layer structure, at least one positive electrode film layer comprises both a first positive electrode active material having a core-shell structure and a second positive electrode active material; and/or, when the positive electrode film layer is of a multi-layer structure, at least one layer of the at least one positive electrode film layer comprises both a first positive electrode active material having a core-shell structure and a second positive electrode active material; the first positive electrode active material comprises an inner core, a first coating layer covering the inner core and a second coating layer covering the first coating layer; wherein the inner core comprises $Li_{1+x}Mn_{1-y}A_yP_{1-z}R_zO_4$, the first coating layer comprises pyrophosphate $MP_2O_7$ and phosphate $XPO_4$, and the second coating layer comprises carbon element; wherein A is selected from one or more elements of Zn, Al, Na, K, Mg, Mo, W, Ti, V, Zr, Fe, Ni, Co, Ga, Sn, Sb, Nb and Ge; R is selected from one or more elements of B. Si, N and S; x is selected from any value in the range of −0.100-0.100; y is selected from any value in the range of 0.001-0.500; z is selected from any value in the range of 0.001-0.100; M and X are independently selected from one or more elements of Li, Fe, Ni, Mg, Co, Cu, Zn, Ti, Ag, Zr, Nb and Al; and the second positive electrode active material is selected from one or more of $LiNi_aCo_bMn_{(1-a-b)}O_2$, $LiNi_aCo_bAl_{(1-a-b)}O_2$ and $LiCoO_2$, wherein a is independently selected from any value in the range of 0.3-0.9 (optionally 0.33-0.8, such as 0.5), and the sum of a and b is independently selected from any value in the range of 0.3-0.9 (optionally 0.66-0.9, such as 0.7).

It should be noted that: when the positive electrode sheet comprises two positive electrode film layers, "the positive electrode film layer is of a single-layer structure or a multi-layer structure" means that the two positive electrode film layers are each independently of a single-layer structure or a multi-layer structure; "when the positive electrode film layer is of a single-layer structure" means when one or two positive electrode film layers are of a single-layer structure; and "when the positive electrode film layer is of a multi-layer structure" means when one or two positive electrode film layers are of a multi-layer structure.

The first positive electrode active material in the present application is of a core-shell structure having two coating layers, wherein the inner core comprises $Li_{1+x}Mn_{1-y}A_yP_{1-z}R_zO_4$. The element A doped at the manganese position of lithium manganese phosphate in the inner core helps to reduce the lattice change rate of lithium manganese phosphate during lithium deintercalation, thus improving the structural stability of lithium manganese phosphate positive electrode material, greatly reducing the dissolution of manganese, and reducing the oxygen activity on the particle surface. The element R doped at the phosphorus position helps to alter the difficulty of the Mn—O bond length change, thereby reducing the migration barrier of lithium ions, promoting the migration of lithium ions, and improving the rate performance of the secondary battery. The first coating layer of the first positive electrode active material of the present application comprises pyrophosphate and phosphate. Due to the higher migration barrier (>1 eV) of transition metals in pyrophosphate, the dissolution of transition metals can be effectively suppressed. Phosphate has an excellent ability to conduct lithium ions, and can reduce the content of lithium impurities on the surface. Additionally, since the second coating layer is a carbon-containing layer, the electrical conductivity and desolvation ability of $LiMnPO_4$ can be effectively improved. In addition, the "barrier" effect of the second coating layer can further hinder the migration of manganese ions into the electrolyte solution, and reduce the corrosion of the active material by the electrolyte solution. Therefore, the first positive electrode active material of the present application can effectively suppress the dissolution of Mn during lithium deintercalation by doping lithium manganese phosphate with specific elements and coating the surface, and at the same time promote the migration of lithium ions, thereby improving the rate performance of the battery cell, and improving the cycling performance and high temperature performance of the secondary battery. It should be noted that the positions of the main characteristic peaks of the first positive electrode active material of the present application are essentially the same as that of $LiMnPO_4$ before doping, indicating that the doped lithium manganese phosphate positive electrode active material has no impurity phases, and the improvement of the performance of the secondary battery is mainly caused by element doping rather than impurity phases.

According to the present application, the first positive electrode active material and the second positive electrode active material are mixed for use, so that the advantages of the two materials are complementary, the energy density of the secondary battery is improved, and the battery simultaneously has excellent rate performance, dynamic performance, cycling performance, low temperature performance and safety. The particles of the first positive electrode active material are uniformly coated on the surface of the second positive electrode active material, so that the crystal lattice of the second positive electrode active material is relatively independent and the skeleton is stable, and it is not easy to collapse during the charging and discharging processes of the secondary battery, which further improves the cycle life of the battery; and in addition, the coating layer formed by the first positive electrode active material provides elastic strain force for external force impact or shearing, effectively solving the safety problem of the second positive electrode active material.

In some embodiments of the first aspect, a positive electrode film layer C and a positive electrode film layer D are respectively provided on both surfaces of the positive electrode current collector, wherein the positive electrode film layer C is of a multi-layer structure, the positive electrode film layer D is of a single-layer structure, and at least one layer in the positive electrode film layer C comprises both the first positive electrode active material and the second positive electrode active material; optionally, the positive electrode film layer D comprises one or both of the first positive electrode active material and the second positive electrode active material; and optionally, the remaining layers in the positive electrode film layer C comprise the first positive electrode active material or the second positive electrode active material.

In some embodiments of the first aspect, a positive electrode film layer C and a positive electrode film layer D are respectively provided on both surfaces of the positive electrode current collector, wherein the positive electrode film layer C is of a multi-layer structure, the positive electrode film layer D is of a single-layer structure, and the positive electrode film layer D comprises both the first positive electrode active material and the second positive electrode active material; and optionally, any layer in the positive electrode film layer C comprises the first positive electrode active material or the second positive electrode active material.

In some embodiments of the first aspect, both surfaces of the positive electrode current collector are respectively provided with a positive electrode film layer, each positive electrode film layer is of a multi-layer structure, and at least one layer in each positive electrode film layer comprises both the first positive electrode active material and the second positive electrode active material; and optionally, the remaining layers in the positive electrode film layer comprise the first positive electrode active material or the second positive electrode active material.

An embodiment of the second aspect of the present application provides a positive electrode sheet comprising a positive electrode current collector and a positive electrode film layer provided on at least one surface of the positive electrode current collector; at least one positive electrode film layer is of a multi-layer structure, and any positive electrode film layer having a multi-layer structure respectively comprises a first positive electrode active material having a core-shell structure and a second positive electrode active material in different layers; the first positive electrode active material comprises an inner core, a first coating layer covering the inner core and a second coating layer covering the first coating layer; wherein the inner core comprises $Li_{1+x}Mn_{1-y}A_yP_{1-z}R_zO_4$, the first coating layer comprises pyrophosphate $MP_2O_7$ and phosphate $XPO_4$, and the second coating layer comprises carbon element; wherein A is selected from one or more elements of Zn, Al, Na, K, Mg, Mo, W, Ti, V, Zr, Fe, Ni, Co, Ga, Sn, Sb, Nb and Ge; R is selected from one or more elements of B, Si, N and S; x is selected from −0.100-0.100; y is selected from 0.001-0.500; z is selected from 0.001-0.100; M and X are independently selected from one or more elements of Li, Fe, Ni, Mg, Co, Cu, Zn, Ti, Ag, Zr, Nb and Al; and the second positive electrode active material is selected from one or more of $LiNi_aCo_bMn_{(1-a-b)}O_2$, $LiNi_aCo_bAl_{(1-a-b)}O_2$ and $LiCoO_2$, wherein a is independently selected from any value in the range of 0.3-0.9 (optionally 0.33-0.8, such as 0.5), and the sum of a and b is independently selected from any value in the range of 0.3-0.9 (optionally 0.66-0.9, such as 0.7); and optionally, any positive electrode film layer having a multi-layer structure respectively comprises the first positive electrode active material and the second positive electrode active material in adjacent layers.

The first positive electrode active material of the present application can greatly reduce the dissolution of transition metals and reduce the oxygen activity on the particle surface, promote the migration of lithium ions, improve the conductivity and desolvation performance, improve the rate performance of the battery, and improve the cycling performance and high temperature performance of the secondary battery while reducing the corrosion of the active material by electrolyte solution. According to the present application, the first positive electrode active material and the second positive electrode active material are used in combination, so that the advantages of the two materials are complementary, the energy density of the secondary battery is improved, and the battery simultaneously has excellent rate performance, dynamic performance, cycling performance and low temperature performance; and moreover, the first positive electrode active material provides elastic strain force for external force impact or shearing, effectively solving the safety problem of the second positive electrode active material.

In some embodiments of the second aspect, both surfaces of the positive electrode current collector are respectively provided with a positive electrode film layer, each positive electrode film layer is of a multi-layer structure, and two adjacent layers in each positive electrode film layer respectively comprise the first positive electrode active material and the second positive electrode active material.

In some embodiments of the second aspect, a positive electrode film layer E and a positive electrode film layer F are respectively provided on both surfaces of the positive electrode current collector, wherein the positive electrode film layer E is of a multi-layer structure, the positive electrode film layer F is of a single-layer structure, and two adjacent layers in the positive electrode film layer E respectively comprise the first positive electrode active material and the second positive electrode active material; and optionally, the remaining layers in the positive electrode film layer E and the positive electrode film layer F comprise the first positive electrode active material or the second positive electrode active material.

An embodiment of the third aspect of the present application provides a positive electrode sheet comprising a positive electrode current collector as well as a positive electrode film layer A and a positive electrode film layer B respectively provided on both surfaces of the positive electrode current collector; the positive electrode film layer A and the positive electrode film layer B are each independently of a single-layer structure or a multi-layer structure; at least one layer of the positive electrode film layer A comprises a first positive electrode active material having a core-shell structure, while at least one layer of the positive electrode film layer B comprises a second positive electrode active material; the first positive electrode active material comprises an inner core, a first coating layer covering the inner core and a second coating layer covering the first coating layer; wherein the inner core comprises $Li_{1+x}Mn_{1-y}A_yP_{1-z}R_zO_4$, the first coating layer comprises pyrophosphate $MP_2O_7$ and phosphate $XPO_4$, and the second coating layer comprises carbon element; wherein A is selected from one or more elements of Zn, Al, Na, K, Mg, Mo, W, Ti, V, Zr, Fe, Ni, Co, Ga, Sn, Sb, Nb and Ge; R is selected from one or more elements of B, Si, N and S; x is selected from −0.100-0.100; y is selected from 0.001-0.500; z is selected from 0.001-0.100; M and X are independently selected from one or more elements of Li, Fe, Ni, Mg, Co, Cu, Zn, Ti, Ag, Zr, Nb and Al; and the second positive electrode active material is selected from one or more of $LiNi_aCo_bMn_{(1-a-b)}O_2$, $LiNi_aCo_bAl_{(1-a-b)}O_2$ and $LiCoO_2$, wherein a is independently selected from any value in the range of 0.3-0.9 (optionally 0.33-0.8, such as 0.5), and the sum of a and b is independently selected from any value in the range of 0.3-0.9 (optionally 0.66-0.9, such as 0.7).

The first positive electrode active material of the present application can greatly reduce the dissolution of transition metals and reduce the oxygen activity on the particle surface, promote the migration of lithium ions, improve the conductivity and desolvation performance, improve the rate performance of the battery, and improve the cycling performance and high temperature performance of the secondary battery while reducing the corrosion of the active material by electrolyte solution. According to the present application, the first positive electrode active material and the second positive electrode active material are used in combination, so that the advantages of the two materials are complementary, the energy density of the secondary battery is improved, and the battery simultaneously has excellent rate performance, dynamic performance, cycling performance and low temperature performance; and moreover, the first positive electrode active material provides elastic strain force for external force impact or shearing, effectively solving the safety problem of the second positive electrode active material.

Unless otherwise specified, in the above chemical formula, when A is two or more elements, the above limitation on the numerical range of y is not only a limitation on the stoichiometric number of each element as A, but also a limitation on the sum of the stoichiometric numbers of each element as A. For example, when A is two or more elements A1, A2 ... An, each of the stoichiometric numbers y1, y2 ... yn for each of A1, A2 ... An is required to fall within the numerical range defined for y in the present application, and the sum of y1, y2 ... yn is also required to fall within this numerical range. Similarly, for the case where R is two or more elements, the limitation on the numerical range of the stoichiometric number of R in the present application also has the above-mentioned meaning.

As shown in FIG. 1, the first positive electrode active material having a core-shell structure according to the present application comprises an inner core 11, a first coating layer 12 covering the inner core 11 and a second coating layer 13 covering the first coating layer 12, wherein the inner core 11 comprises $Li_{1+x}Mn_{1-y}A_yP_{1-z}R_zO_4$. The element A doped at the manganese position of lithium manganese phosphate in the inner core 11 helps to reduce the lattice change rate of lithium manganese phosphate during lithium deintercalation, thus improving the structural stability of lithium manganese phosphate positive electrode material, greatly reducing the dissolution of manganese, and reducing the oxygen activity on the particle surface. The element R doped at the phosphorus position helps to alter the difficulty of the Mn—O bond length change, thereby reducing the migration barrier of lithium ions, promoting the migration of lithium ions, and improving the rate performance of the secondary battery.

In some embodiments of the first to third aspects, $Li_{1+x}Mn_{1-y}A_yP_{1-z}R_zO_4$ maintains electrical neutrality as a whole.

In some embodiments of the first to third aspects, the mass ratio of the first active material to the second active material is 1:7-7:1, optionally 1:4-4:1, and further optionally 1:3-3:1, such as 1:7, 1:5, 1:3, 1:2, 3:5, 1:1, 5:3, 2:1, 3:1, 5:1, and 7:1.

This ensures that the secondary battery simultaneous has excellent rate performance, excellent cycling performance, as well as high temperature stability, high energy density, excellent dynamic performance and low temperature performance, the interfacial side reactions are reduced, and the safety of the secondary battery is improved.

In some embodiments of the first to third aspects, in the first positive electrode active material, A is selected from one or more elements of Zn, Fe, Ti, V, Ni, Co and Mg; and/or, A is selected from at least two elements of Fe. Ti, V, Ni, Co and Mg. By selecting the doping elements within the above-mentioned range, it is favorable for enhancing the doping effect. On the one hand, the lattice change rate is further reduced, so that the dissolution of manganese is suppressed, and the consumption of electrolyte solution and active lithium is reduced; and on the other hand, it is also favorable for further reducing the surface oxygen activity and reduce the interfacial side reactions between the positive electrode active material and the electrolyte solution, so that the cycling performance and high temperature storage performance of the secondary battery are improved.

In some embodiments of the first to third aspects, x is selected from any value in the range of −0.100-0.006. By selecting the value of x in this range, the dynamic performance of the first positive electrode active material can be further improved.

In some embodiments of the first to third aspects, y is selected from any value in the range of 0.1-0.4. By selecting the value of y in this range, the gram capacity of the first positive electrode active material and the rate performance of the secondary battery can be further improved.

In some embodiments of the first to third aspects, M and X are independently selected from one or more elements of Li and Fe.

In some embodiments of the first to third aspects, the ratio of y to 1−y is selected from 1:10 to 10:1, optionally 1:4 to 1:1. Here, y represents the sum of the stoichiometric numbers of doping elements at the position of Mn. When the above conditions are satisfied, the energy density and cycling performance of the secondary battery made of the positive electrode sheet are further improved.

In some embodiments of the first to third aspects, the ratio of z to 1−z is selected from 1:999 to 1:9, optionally 1:499 to 1:249. Here, z represents the sum of the stoichiometric numbers of doping elements at the position of P. When the above conditions are satisfied, the energy density and cycling performance of the secondary battery made of the positive electrode sheet can be further improved.

In some embodiments of the first to third aspects, in the first positive electrode active material, the phosphate in the first coating layer has an interplanar spacing of 0.345-0.358 nm and an included angle of crystallographic direction (111) of 24.25°-26.45°; and the pyrophosphate in the first coating layer has an interplanar spacing of 0.293-0.326 nm and an included angle of crystallographic direction (111) of 26.41°-32.57°.

When the interplanar spacings and included angles of crystallographic direction (111) of the phosphate and pyrophosphate in the first coating layer are within the above range, the impurity phases in the coating layer can be effectively avoided, thereby increasing the gram capacity of the material and improving the cycling performance and rate performance of the secondary battery.

In some embodiments of the first to third aspects, in the first positive electrode active material, the coating amount of the first coating layer is greater than 0 wt % and less than or equal to 7 wt %, optionally 4-5.6 wt %, based on the weight of the inner core.

When the coating amount of the first coating layer is within the above range, it is possible to further suppress manganese dissolution while further promoting transport of lithium ions. Also the following situations can be effectively avoided: if the coating amount of the first coating layer is too small, the suppression effect of pyrophosphate on manganese dissolution may be insufficient, and at the same time, the lithium ion transport performance is not significantly improved; and if the coating amount of the first coating layer is too large, it may cause the coating layer to be too thick, increasing the battery impedance, and affecting the dynamic performance of the secondary battery.

In some embodiments of the first to third aspects, in the first positive electrode active material, the weight ratio of the pyrophosphate to phosphate in the first coating layer is 1:3 to 3:1, optionally 1:3 to 1:1.

A suitable proportion of pyrophosphate and phosphate is favorable for the full synergistic effect of the two. Also the following situations can be effectively avoided: If there is too much pyrophosphate and too little phosphate, the battery impedance may increase; and if there is too much phosphate and too little pyrophosphate, manganese dissolution is not significantly suppressed.

In some embodiments of the first to third aspects, in the first positive electrode active material, the crystallinities of the pyrophosphate and phosphate are each independently 10% to 100%, optionally 50% to 100%. In the first coating layer of the lithium manganese phosphate positive electrode active material of the present application, the pyrophosphate and phosphate with certain crystallinities are favorable for maintaining the structural stability of the first coating layer and reducing lattice defects. On the one hand, this is favorable for the pyrophosphate to fully hinder the dissolution of manganese, and on the other hand, it is also favorable for the phosphate to reduce the content of lithium impurities on the surface and reduce the valence state of oxygen on the surface, thereby reducing the interfacial side reactions between the positive electrode material and the electrolyte solution, reducing the consumption of the electrolyte solution, and improving the cycling performance and safety performance of the secondary battery.

In some embodiments of the first to third aspects, in the first positive electrode active material, the coating amount of the second coating layer is greater than 0 wt % and less than or equal to 6 wt %, optionally 3-5 wt %, based on the weight of the inner core.

On the one hand, the carbon-containing layer as the second coating layer can function as a "barrier" to avoid the direct contact between the first positive electrode active material and the electrolyte solution, thus reducing the corrosion of the active material by the electrolyte solution, and improving the safety performance of the secondary battery at high temperatures. On the other hand, it has strong electrical conductivity, which can reduce the internal resistance of the secondary battery, thus improving the dynamic performance of the secondary battery. However, since the gram capacity of carbon material is relatively low, when the amount of the second coating layer is too large, the overall gram capacity of the positive electrode active material may be reduced.

Therefore, when the coating amount of the second coating layer is in the above range, the dynamic performance and safety performance of the secondary battery can be further improved without sacrificing the gram capacity of the positive electrode active material.

In some embodiments of the first to third aspects, the concentration of Li/Mn antisite defects in the first positive electrode active material is 4% or less, optionally 2% or less. In the first positive electrode active material of the present application, the Li/Mn antisite defect refers to the position interchange of $Li^+$ and $Mn^{2+}$ in the $LiMnPO_4$ lattice. Since $Li^+$ transport channel is a one-dimensional channel, $Mn^{2+}$ is difficult to migrate in the $Li^+$ transport channel, the antisite defective $Mn^{2+}$ will hinder the transport of $Li^+$. By controlling the concentration of Li/Mn antisite defects at a low level, the gram capacity of $LiMnPO_4$ and the rate performance of the secondary battery can be improved. In the present application, the concentration of antisite defects can be determined according to JIS K 0131-19%, for example.

In some embodiments of the first to third aspects, the lattice change rate of the first positive electrode active material is 6% or less, optionally 4% or less. The lithium deintercalation process of $LiMnPO_4$ is a two-phase reaction. The interfacial stress between two phases is determined by the lattice change rate; the smaller the lattice change rate is, the smaller the interfacial stress is, and the easier $Li^+$ transports. Therefore, reducing the lattice change rate of the inner core will be favorable for enhancing the transport of $Li^+$, thereby improving the rate performance of the secondary battery.

In some embodiments of the first to third aspects, the surface oxygen valence state of the first positive electrode active material is −1.88 or less, optionally −1.98~−1.88. This is because that the higher the valence state of oxygen in the compound is, the stronger ability to obtain electrons it has, that is, the more oxidizing it is. In the first positive electrode active material of the present application, by controlling the surface valence state of oxygen at a relatively low level, the reactivity of the surface of the positive electrode material can be reduced, and the interfacial side reactions between the positive electrode material and the electrolyte solution can be reduced, thereby improving the cycling performance and high temperature storage performance of the secondary battery.

In some embodiments of the first to third aspects, the compaction density of the first positive electrode active material at 3 tons (T) is 2.0 g/cm$^3$ or more, optionally 2.2 g/cm$^3$ or more. The higher the compaction density of the first positive electrode active material is, that is, the greater the weight of the active material per unit volume is, the more favorable for increasing the volumetric energy density of the secondary battery it will be. In the present application, the compaction density can be determined according to GB/T 24533-2009, for example.

In some embodiments of the first to third aspects, the sum of the masses of the first positive electrode active material and the second positive electrode active material accounts for 88%-98.7% of the mass of the positive electrode sheet. It is further ensured that the secondary battery has excellent rate performance, dynamic performance, cycling performance and low temperature performance, and has higher energy density.

In some embodiments of the first to third aspects, the ratio among a, (1−a−b) and b in $LiNi_aCo_bMn_{(1-a-b)}O_2$ is 5:2:3 or 3:1:1 or 8:1:1; and/or, the ratio among a, b and (1−a−b) in $LiNi_aCo_bMn_{(1-a-b)}O_2$ is 5:2:3 or 3:1:1 or 8:1:1. As a result, the energy density of the secondary battery can be further improved.

In some embodiments of the first to third aspects, the positive electrode current collector can be a metal foil or a composite current collector. For example, an aluminum foil can be used as the metal foil. The composite current collector may include a high molecular material substrate layer and a metal layer formed on at least one surface of the high molecular material substrate layer. The composite current collector can be formed by forming a metal material (aluminum, aluminum alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In some embodiments of the first to third aspects, the positive electrode film layer may further comprise other positive electrode active materials commonly known in the art for batteries. As an example, the positive electrode active material may include at least one of the following materials: lithium-containing phosphate with olivine structure, lithium transition metal oxide, and their respective modified compounds. However, the present application is not limited to these materials, and other conventional materials useful as positive electrode active materials for batteries can also be used. It is possible to use only one of these positive electrode active materials, or to use two or more in combination. Among them, examples of lithium transition metal oxides may include, but are not limited to, at least one of lithium nickel oxide (such as $LiNiO_2$), lithium manganese oxide (such as $LiMnO_2$ and $LiMn_2O_4$), lithium nickel cobalt oxide, lithium manganese cobalt oxide, lithium nickel manganese oxide and modified compounds thereof. Examples of lithium-containing phosphate with olivine structure may include, but are not limited to, at least one of lithium iron phosphate (such as $LiFePO_4$ (also abbreviated as LFP)), lithium iron phosphate-carbon composite, lithium manganese phosphate (such as $LiMnPO_4$), lithium manganese phosphate-carbon composite, lithium manganese iron phosphate, and lithium manganese iron phosphate-carbon composite.

In some embodiments of the first to third aspects, the positive electrode film layer further optionally comprises a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorinated acrylate resin.

In some embodiments of the first to third aspects, the positive electrode film layer further optionally comprises a conductive agent. As an example, the conductive agent may include at least one of superconducting carbon, acetylene black, carbon black, Ketjen black, carbon dot, carbon nanotube, graphene, and carbon nanofiber.

[Negative Electrode Sheet]

The negative electrode sheet comprises a negative electrode current collector and a negative electrode film layer provided on at least one surface of the negative electrode current collector, wherein the negative electrode film layer comprises a negative electrode active material.

As an example, the negative electrode current collector has two opposite surfaces in its own thickness direction, and the negative electrode film layer is provided on either one or both of the two opposite surfaces of the negative electrode current collector.

In some embodiments, the negative electrode current collector can be a metal foil or a composite current collector. For example, a copper foil can be used as the metal foil. The composite current collector may include a high molecular material substrate layer and a metal layer formed on at least one surface of the high molecular material substrate. The composite current collector can be formed by forming a metal material (copper, copper alloy, nickel, nickel alloy, titanium, titanium alloy, silver and silver alloy, etc.) on a high molecular material substrate (such as polypropylene (PP), polyethylene terephthalate (PET), polybutylene terephthalate (PBT), polystyrene (PS), and polyethylene (PE)).

In some embodiments, the negative electrode active material may be a negative electrode active material commonly known in the art for batteries. As an example, the negative electrode active material may include at least one of artificial graphite, natural graphite, soft carbon, hard carbon, a silicon-based material, a tin-based material, lithium titanate, and the like. The silicon-based material may be selected from at least one of elemental silicon, silicon-oxygen compound, silicon-carbon composite, silicon-nitrogen composite, and silicon alloy. The tin-based material may be selected from at least one of elemental tin, tin-oxygen compound, and tin alloy. However, the present application is not limited to these materials, and other conventional materials useful as negative electrode active materials for batteries can also be used. These negative electrode active materials may be used alone or in combination of two or more thereof.

In some embodiments, the negative electrode film layer further optionally comprises a binder. As an example, the binder may be selected from at least one of styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode film layer further optionally comprises a conductive agent. As an example, the conductive agent may be selected from at least one of superconducting carbon, acetylene black, carbon black, Ketjen black, carbon dot, carbon nanotube, graphene, and carbon nanofiber.

In some embodiments, the negative electrode film layer further optionally comprises other auxiliaries, for example, a thickener (e.g., sodium carboxymethyl cellulose (CMC-Na)) and the like.

In some embodiments, the negative electrode sheet can be prepared by dispersing the components for preparing the negative electrode sheet, for example, the negative electrode active material, the conductive agent, the binder and any other components in a solvent (for example, deionized water) to form a negative electrode slurry; and coating the negative electrode slurry on a negative electrode current collector, followed by oven drying, cold pressing and other procedures, to obtain the negative electrode sheet.

[Electrolyte]

The electrolyte serves to conduct ions between the positive electrode sheet and the negative electrode sheet. The type of the electrolyte is not particularly limited in the present application, and can be selected according to requirements. For example, the electrolyte may be in a liquid state, a gel state, or an all-solid state.

In some embodiments, the electrolyte is in a liquid state, and includes an electrolyte salt and a solvent.

In some embodiments, the electrolyte salt may be selected from at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoro (oxalato)borate, lithium bis(oxalate)borate, lithium difluoro bis(oxalato)phosphate, and lithium tetrafluoro(oxalato) phosphate.

In some embodiments, the solvent may be selected from at least one of ethylene carbonate, propylene carbonate, methyl ethyl carbonate, diethyl carbonate, dimethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, methyl ethyl sulfone, and diethyl sulfone.

In some embodiments, the electrolyte solution further optionally comprises an additive. As an example, the additive may include a negative electrode film-forming additive, a positive electrode film-forming additive, and also an additive capable of improving certain properties of the battery, such as an additive for improving the overcharge performance of the battery, and an additive for improving the high temperature or low temperature performance of the battery, etc.

[Separator]

In some embodiments, the secondary battery further comprises a separator. The type of the separator is not particularly limited in the present application, and any well known separator with a porous structure having good chemical stability and mechanical stability may be selected.

In some embodiments, the material of the separator may be selected from at least one of glass fiber, non-woven cloth, polyethylene, polypropylene, and polyvinylidene fluoride. The separator may be a single-layer film or a multi-layer composite film, and is not particularly limited. When the separator is a multi-layer composite film, the material of each layer may be the same or different, which is not particularly limited.

In some embodiments, the positive electrode sheet, the negative electrode sheet, and the separator can be made into an electrode assembly by a winding process or a stacking process.

In some embodiments, the secondary battery may comprise an outer package. The outer package can be used to encapsulate the above-mentioned electrode assembly and electrolyte.

In some embodiments, the outer package of the secondary battery may be a hard case, such as a hard plastic case, an aluminum case, a steel case, and the like. The outer package of the secondary battery may also be a soft pack, such as a bag-type soft pack. The material of the soft pack may be a plastic, and examples of the plastic include polypropylene, polybutylene terephthalate and polybutylene succinate, etc.

Figure 2:
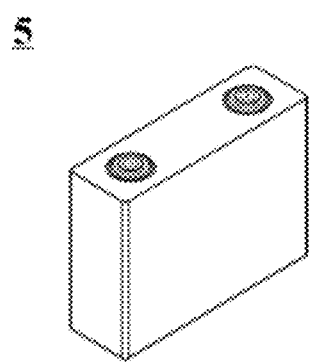
FIG. 2 is a schematic view of a secondary battery according to an embodiment of the present application.

The present application has no particular limitation on the shape of the secondary battery, which can be cylindrical, square or any other shapes. For example, FIG. 2 shows an example of a secondary battery 5 having a square structure.

Figure 3:
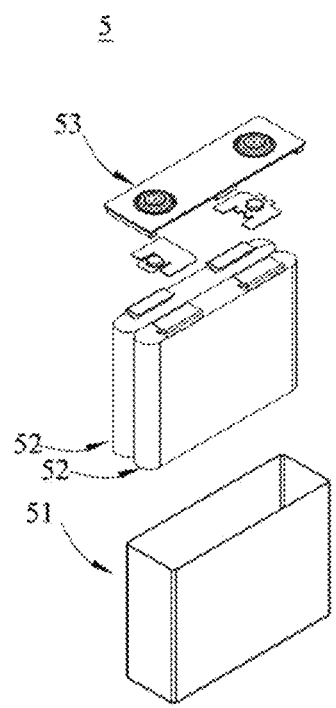
FIG. 3 is an exploded view of the secondary battery shown in FIG. 2 according to an embodiment of the present application.

In some embodiments, referring to FIG. 3, the outer package may include a case 51 and a cover plate 53. Here, the case 51 can include a bottom plate and a side plate connected to the bottom plate, with the bottom plate and the side plate enclosing to form an accommodating cavity. The case 51 has an opening in communication with the accommodating cavity, and the cover plate 53 can cover the opening to close the accommodating cavity. The positive electrode sheet, the negative electrode sheet, and the separator may be formed into an electrode assembly 52 by a winding process or a stacking process. The electrode assembly 52 is encapsulated within the accommodating cavity. The electrolyte solution impregnates the electrode assembly 52. The number of electrode assemblies 52 comprised in the secondary battery 5 may be one or more, which can be selected by those skilled in the art according to specific actual requirements.

In some embodiments, the secondary batteries may be assembled into a battery module, and the number of the secondary batteries comprised in the battery module may be one or more, and the specific number may be selected by those skilled in the art according to the application and capacity of the battery module.

Figure 4:
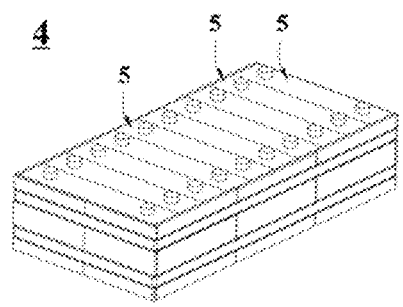
FIG. 4 is a schematic view of a battery module according to an embodiment of the present application.

FIG. 4 shows a battery module 4 as an example. Referring to FIG. 4, in the battery module 4, a plurality of secondary batteries 5 may be sequentially arranged along a length direction of the battery module 4. Of course, they can also be arranged in any other way. The plurality of secondary batteries 5 may further be fixed by fasteners.

Optionally, the battery module 4 may further include a case having an accommodating space, in which the plurality of secondary batteries 5 are accommodated.

In some embodiments, the above battery modules may further be assembled into a battery pack, the number of battery modules comprised in the battery pack may be one or more, and the specific number can be selected by those skilled in the art according to the application and capacity of the battery pack.

Figure 5:
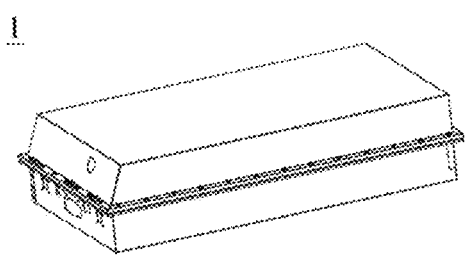
FIG. 5 is a schematic view of a battery pack according to an embodiment of the present application.
Figure 6:
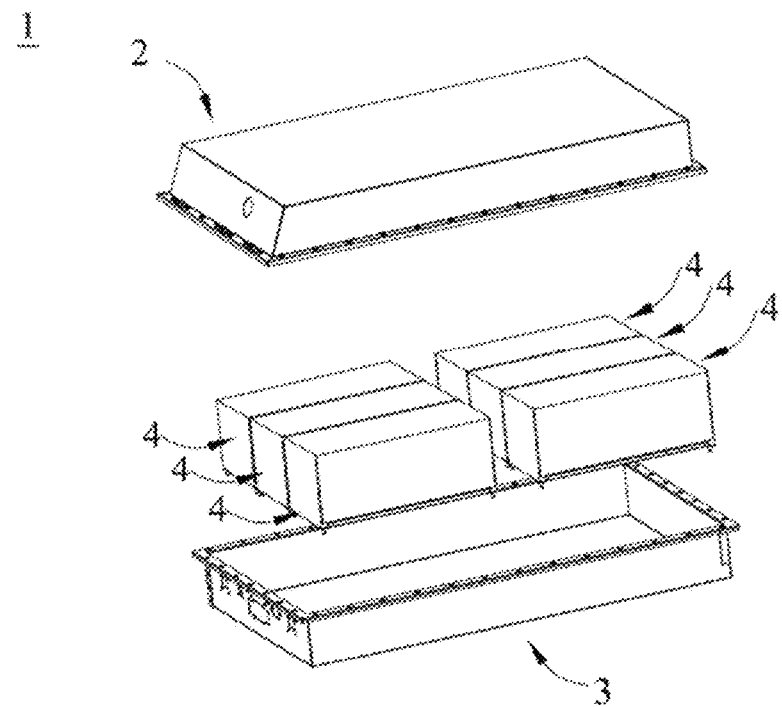
FIG. 6 is an exploded view of the battery pack shown in FIG. 5 according to an embodiment of the present application.

FIGS. 5 and 6 show a battery pack 1 as an example. Referring to FIGS. 5 and 6, the battery pack 1 may comprise a battery box and a plurality of battery modules 4 provided in the battery box. The battery box comprises an upper box body 2 and a lower box body 3, where the upper box body 2 can cover the lower box body 3 and forms an enclosed space for accommodating the battery module 4. The plurality of battery modules 4 may be arranged in the battery box in any manner.

Additionally, the present application further provides an electrical apparatus comprising at least one of the secondary battery, the battery module, or the battery pack provided in the present application. The secondary battery, the battery module, or the battery pack can be used as a power source for the electrical apparatus, and can also be used as an energy storage unit for the electrical apparatus. The electrical apparatus may include, but is not limited to, a mobile device (such as a mobile phone, and a laptop, etc.), an electric vehicle (such as an all-electric vehicle, a hybrid electric vehicle, a plug-in hybrid electric vehicle, an electric bicycle, an electric scooter, an electric golf cart, and an electric truck, etc.), an electric train, a ship, a satellite, and an energy storage system, etc.

For the electrical apparatus, the secondary battery, the battery module, or the battery pack can be selected according to its use requirements.

Figure 7:
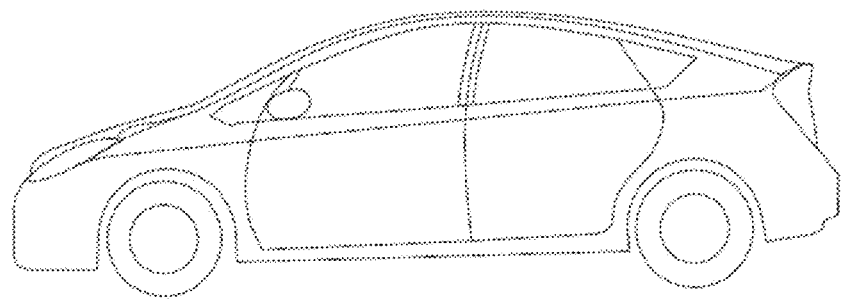
FIG. 7 is a schematic view of an electrical apparatus using a secondary battery according to an embodiment of the present application as a power source.
Figure 8:
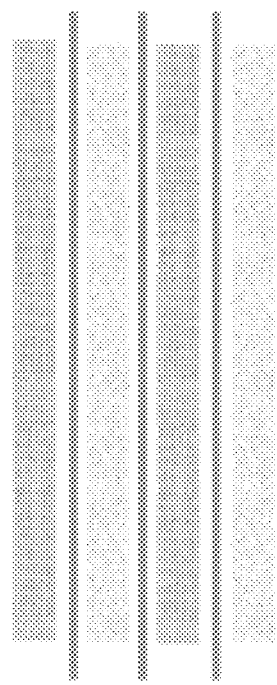
FIG. 8 is a schematic structural view of a battery made of a positive electrode sheet P1 according to the present application.
Figure 9:
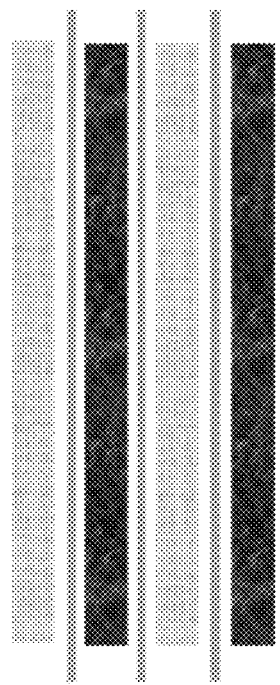
FIG. 9 is a schematic structural view of a battery made of a positive electrode sheet P2 according to the present application.
Figure 10:
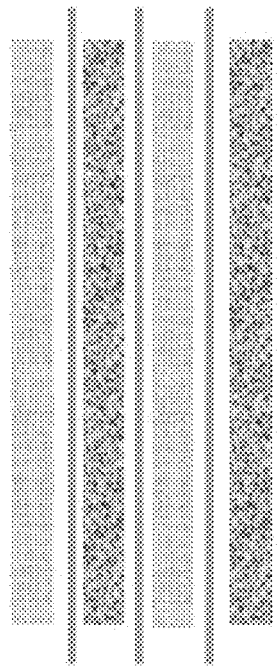
FIG. 10 is a schematic structural view of a battery made of a positive electrode sheet P3 according to the present application.
Figure 11:
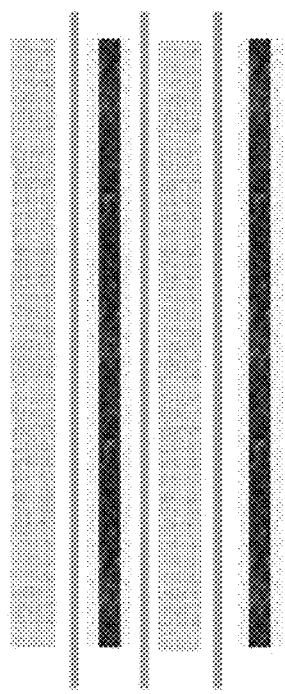
FIG. 11 is a schematic structural view of a battery made of a positive electrode sheet P8 according to the present application.
Figure 12:
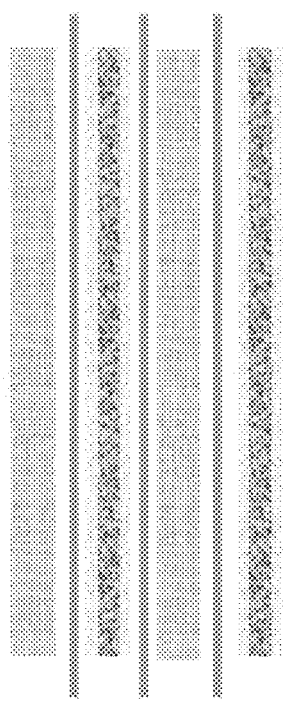
FIG. 12 is a schematic structural view of a battery made of a positive electrode sheet P10 according to the present application.
Figure 13:
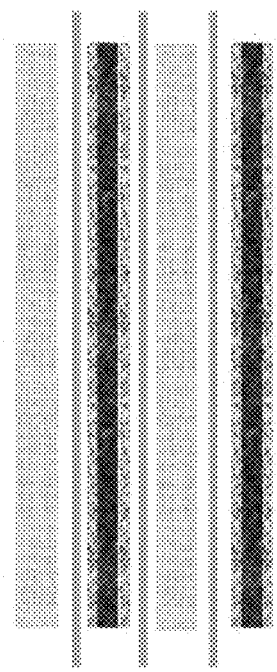
FIG. 13 is a schematic structural view of a battery made of a positive electrode sheet P11 according to the present application.
Figure 14:
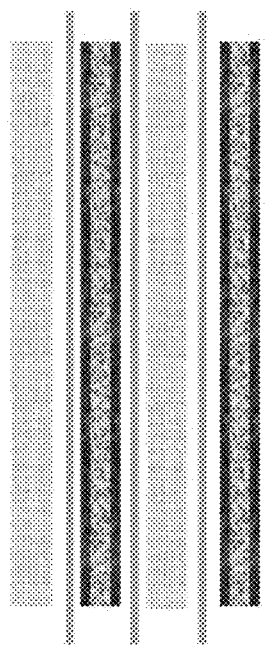
FIG. 14 is a schematic structural view of a battery made of a positive electrode sheet P12 according to the present application.
Figure 15:
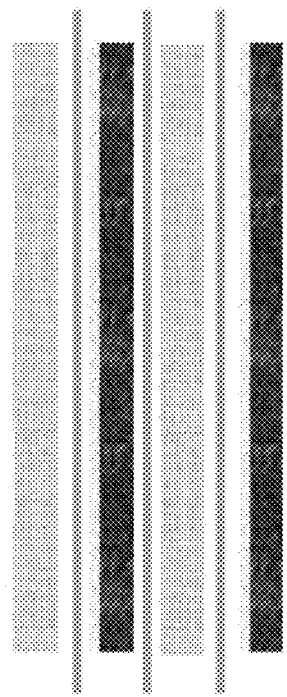
FIG. 15 is a schematic structural view of a battery made of a positive electrode sheet P17 according to the present application.
Figure 16:
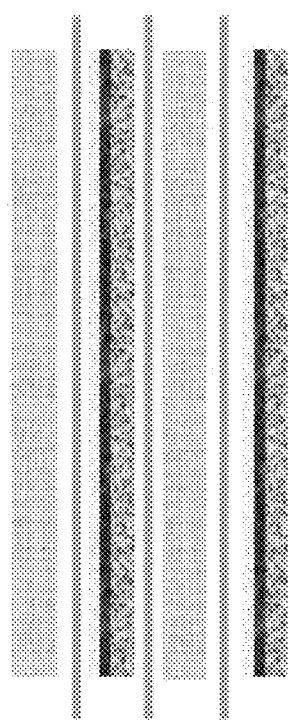
FIG. 16 is a schematic structural view of a battery made of a positive electrode sheet P18 according to the present application.
Figure 17:
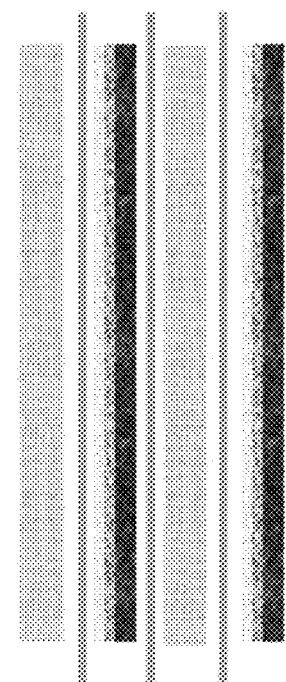
FIG. 17 is a schematic structural view of a battery made of a positive electrode sheet P23 according to the present application.
Figure 18:
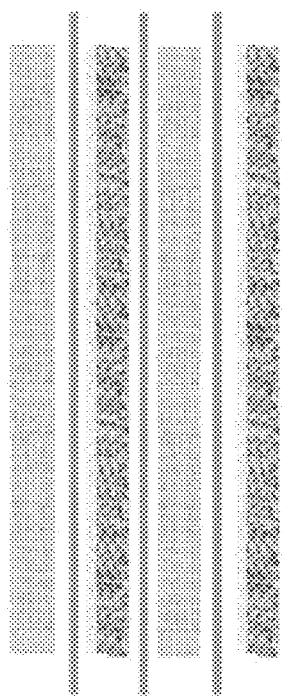
FIG. 18 is a schematic structural view of a battery made of a positive electrode sheet P24 according to the present application.
Figure 19:
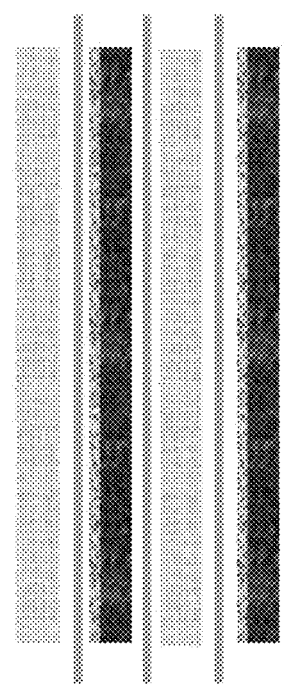
FIG. 19 is a schematic structural view of a battery made of a positive electrode sheet P26 according to the present application.
Figure 20:
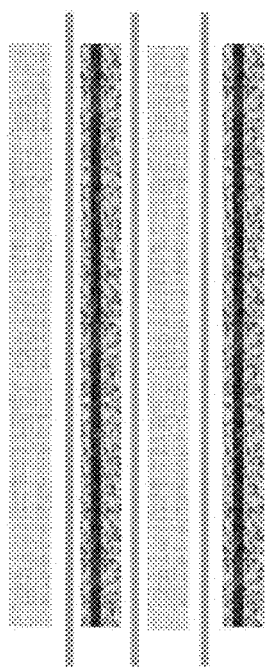
FIG. 20 is a schematic structural view of a battery made of a positive electrode sheet P27 according to the present application.

FIG. 7 shows an electrical apparatus as an example. The electrical apparatus is an all-electric vehicle, a hybrid electric vehicle, or a plug-in hybrid electric vehicle, etc. In order to meet the requirements of the electrical apparatus for high power and high energy density of the secondary batteries, a battery pack or a battery module may be used.

EXAMPLES

Examples of the present application will be described hereinafter. The examples described below are exemplary and only used to explain the present application, and are not to be construed as limiting the present application. Where specific techniques or conditions are not specified in the examples, the techniques or conditions described in the literatures of the art or the product specifications are followed. The reagents or instruments for which no manufacturers are noted are all conventional products commercially available from markets. If not specified, the content of each ingredient in the examples of the present disclosure is based on the mass without water of crystallization.

The sources of raw materials involved in the preparation examples and examples of the present application are as follows:

| Name | Chemical formula | Manufacturer | Specification |
| --- | --- | --- | --- |
| Manganese carbonate | $MnCO_3$ | Shandong West Asia Chemical Industry Co., Ltd. | 1 Kg |
| Lithium carbonate | $Li_2CO_3$ | Shandong West Asia Chemical Industry Co., Ltd. | 1 Kg |
| Magnesium carbonate | $MgCO_3$ | Shandong West Asia Chemical Industry Co., Ltd. | 1 Kg |
| Zinc carbonate | $ZnCO_3$ | Wuhan Xinru Chemical Co., Ltd | 25 Kg |
| Ferrous Carbonate | $FeCO_3$ | Xi'an Lanzhiguang Fine Materials Co., Ltd. | 1 Kg |
| Nickel sulfate | $NiCO_3$ | Shandong West Asia Chemical Industry Co., Ltd. | 1 Kg |
| Titanium sulfate | $Ti(SO_4)_2$ | Shandong West Asia Chemical Industry Co., Ltd. | 1 Kg |
| Cobalt sulfate | $CoSO_4$ | Xiamen Zhixin Chemical Co., Ltd. | 500 g |
| Vanadium dichloride | $VCl_2$ | Shanghai Jinjinle Industrial Co., Ltd. | 1 Kg |
| Oxalic acid dihydrate | $C_2H_2O_4 \cdot 2H_2O$ | Shanghai Jinjinle Industrial Co., Ltd. | 1 Kg |
| Ammonium dihydrogen phosphate | $NH_4H_2PO_4$ | Shanghai Chengshao Biotechnology Co., Ltd. | 500 g |
| Sucrose | $C_{12}H_{22}O_{11}$ | Shanghai Yuanye Bio-Technology Co., Ltd | 100 g |
| Sulfuric acid | $H_2SO_4$ | Shenzhen Hisian Biotechnology Co., Ltd. | Mass fraction 60% |
| Nitric acid | $HNO_3$ | Anhui Lingtian Fine Chemical Co., Ltd. | Mass fraction 60% |
| Silicic acid | $H_2SiO_3$ | Shanghai Yuanye Bio-Technology Co., Ltd | 100 g |
| Boric acid | $H_3BO_3$ | Changzhou Qidi Chemical Co., Ltd. | 1 Kg |

Example 1-1

(1) Preparation of Co-Doped Lithium Manganese Phosphate Inner Core

Preparation of manganese oxalate co-doped with Fe, Co and V: 689.5 g of manganese carbonate (calculated as $MnCO_3$, the same below), 455.2 g of ferrous carbonate (calculated as $FeCO_3$, the same below), 4.6 g of cobalt sulfate (calculated as $CoSO_4$, the same below) and 4.9 g of vanadium dichloride (calculated as $VCl_2$, the same below) were fully mixed in a mixer for 6 hours. The mixture was transferred to a reaction kettle, and 5 liters of deionized water and 1260.6 g of oxalic acid dihydrate (calculated as $C_2H_2O_4 \cdot 2H_2O$, the same below) were added. The reaction kettle was heated to 80° C., and stirred at a rotational speed of 600 rpm for 6 hours, until the reaction was terminated (no gas bubbles were generated), and a Fe, Co, V and S co-doped manganese oxalate suspension was obtained. Then the suspension was filtered, the filter cake was dried at 120° C. and then ground to obtain Fe. Co and V co-doped manganese oxalate dihydrate particles with a median particle diameter Dv50 of 100 nm.

Preparation of lithium manganese phosphate co-doped with Fe, Co, V and S: manganese oxalate dihydrate particles obtained in the previous step (1793.4 g), 369.0 g of lithium carbonate (calculated as $Li_2CO_3$, the same below), 1.6 g of dilute sulfuric acid with a concentration of 60% (calculated as 60% $H_2SO_4$, the same below) and 1148.9 g of ammonium dihydrogen phosphate (calculated as $NH_4H_2PO_4$, the same below) were added to 20 liters of deionized water, and the mixture was stirred for 10 hours to mix well to obtain a slurry. The slurry was transferred to a spray drying device for spray drying and granulation, the drying was set at a temperature of 250° C. for 4 hours to obtain powders. In a protective atmosphere of nitrogen (90 vol %)+hydrogen (10 vol %), the above powders were sintered at 700° C. for 4 hours to obtain 1572.1 g of lithium manganese phosphate co-doped with Fe. Co, V and S.

(2) Preparation of Lithium Iron Pyrophosphate and Lithium Iron Phosphate

Preparation of lithium iron pyrophosphate powders: 4.77 g of lithium carbonate, 7.47 g of ferrous carbonate, 14.84 g of ammonium dihydrogen phosphate and 1.3 g of oxalic acid dihydrate were dissolved in 50 ml deionized water. The pH of the mixture was 5, and the reaction mixture was stirred for 2 hours to fully react. Then the reacted solution was warmed to 80° C. and maintained at this temperature for 4 hours to obtain a suspension comprising $Li_2FeP_2O_7$, which was filtered, washed with deionized water and dried at 120° C. for 4 h to obtain powders. The powders were sintered at 650° C. under a nitrogen atmosphere for 8 hours, cooled naturally to room temperature, and then ground to obtain $Li_2FeP_2O_7$ powders.

Preparation of lithium iron phosphate suspension: 11.1 g of lithium carbonate, 34.8 g of ferrous carbonate, 34.5 g of ammonium dihydrogen phosphate, 1.3 g of oxalic acid dihydrate and 74.6 g of sucrose (calculated as $C_2H_{22}O_{11}$, the same below) were dissolved in 150 ml of deionized water to obtain a mixture, and then the above mixture was stirred for 6 hours to fully react. Then the reacted solution was warmed to 120° C. and maintained at this temperature for 6 hours to obtain a suspension comprising $LiFePO_4$.

(3) Coating 1572.1 g of the above lithium manganese phosphate co-doped with Fe, Co, V and S and 15.72 g of the above lithium iron pyrophosphate ($Li_2FeP_2O_7$) powders were added to the lithium iron phosphate ($LiFePO_4$) suspension prepared in the previous step, stirred and mixed uniformly, and then transferred to a vacuum oven for drying at 150° C. for 6 hours. The resulting product was then dispersed by sanding. After dispersion, the resulting product was sintered at 700° C. for 6 hours in a nitrogen atmosphere to obtain the target product, i.e. lithium manganese phosphate coated with two layers.

Examples 1-2 to 1-6

In the preparation of the co-doped lithium manganese phosphate inner core, the conditions for preparing the lithium manganese phosphate inner core in Examples 1-2 to 1-6 were the same as those in Example 1-1, except that vanadium dichloride and cobalt sulfate were not used, and 463.4 g of ferrous carbonate, 1.6 g of dilute sulfuric acid with a concentration of 60%, 1148.9 g of ammonium dihydrogen phosphate and 369.0 g of lithium carbonate were used.

In addition, in the preparation of lithium iron pyrophosphate and lithium iron phosphate as well as in covering the first coating layer and the second coating layer, except that the raw materials used were adjusted accordingly in accordance with the ratio of the coating amount shown in Table 1 to the coating amount corresponding to Example 1-1, so that the amounts of $Li_2FeP_2O_7/LiFePO_4$ used in Examples 1-2 to 1-6 were 12.6 g/37.7 g, 15.7 g/47.1 g, 18.8 g/56.5 g, 22.0/66.0 g and 25.1 g/75.4 g, respectively, and the amount of sucrose used in Examples 1-2 to 1-6 was 37.3 g, other conditions were the same as those in Example 1-1.

Examples 1-7 to 1-10

The conditions of Examples 1-7 to 1-10 were the same as those in Example 1-3, except that the amounts of sucrose used were 74.6 g, 149.1 g, 186.4 g and 223.7 g, respectively, so that the corresponding coating amounts of the carbon layer as the second coating layer were 31.4 g, 62.9 g, 78.6 g and 94.3 g, respectively.

Examples 1-11 to 1-14

The conditions of Examples 1-11 to 1-14 were the same as those in Example 1-7, except that in the preparation of lithium iron pyrophosphate and lithium iron phosphate, the amounts of various raw materials used were adjusted accordingly in accordance with the coating amounts shown in Table 1, so that the amounts of $Li_2FeP_2O_7/LiFePO_4$ used were 23.6 g/39.3 g, 31.4 g/31.4 g, 39.3 g/23.6 g and 47.2 g/15.7 g, respectively.

Example 1-15

The conditions of Example 1-15 were the same as those in Example 1-14, except that in the preparation of the co-doped lithium manganese phosphate inner core, 492.80 g of $ZnCO_3$ was used instead of ferrous carbonate.

Examples 1-16 to 1-18

The conditions of Examples 1-17 to 1-19 were the same as those in Example 1-7, except that in Example 1-16, 466.4 g of $NiCO_3$, 5.0 g of zinc carbonate and 7.2 g of titanium sulfate were used instead of ferrous carbonate in the preparation of the co-doped lithium manganese phosphate inner core, in Example 1-17, 455.2 g of ferrous carbonate and 8.5 g of vanadium dichloride were used in the preparation of the co-doped lithium manganese phosphate inner core, and in Example 1-18, 455.2 g of ferrous carbonate, 4.9 g of vanadium dichloride and 2.5 g of magnesium carbonate were used in the preparation of the co-doped lithium manganese phosphate inner core.

Examples 1-19 to 1-20

The conditions of Examples 1-19 to 1-20 were the same as those in Example 1-18, except that in Example 1-19, in the preparation of the co-doped lithium manganese phosphate inner core, 369.4 g of lithium carbonate was used, and 1.05 g of dilute nitric acid with a concentration of 60% was used instead of dilute sulfuric acid, and in Example 1-20, in the preparation of the co-doped lithium manganese phosphate inner core, 369.7 g of lithium carbonate was used, and 0.78 g of silicic acid was used instead of dilute sulfuric acid.

Examples 1-21 to 1-22

The conditions of Examples 1-21 to 1-22 were the same as those in Example 1-20, except that in Example 1-21, 632.0 g of manganese carbonate, 463.30 g of ferrous carbonate, 30.5 g of vanadium dichloride, 21.0 g of magnesium carbonate and 0.78 g of silicic acid were used in the preparation of the co-doped lithium manganese phosphate inner core; and in Example 1-22, 746.9 g of manganese carbonate, 289.6 g of ferrous carbonate, 60.9 g of vanadium dichloride, 42.1 g of magnesium carbonate and 0.78 g of silicic acid were used in the preparation of the co-doped lithium manganese phosphate inner core.

Examples 1-23 to 1-24

The conditions of Examples 1-23 to 1-24 were the same as those in Example 1-22, except that in Example 1-23, 804.6 g of manganese carbonate, 231.7 g of ferrous carbonate, 1156.2 g of ammonium dihydrogen phosphate, 1.2 g of boric acid (99.5% by mass fraction) and 370.8 g of lithium carbonate were used in the preparation of the co-doped lithium manganese phosphate inner core; and in Example 1-24, 862.1 g of manganese carbonate, 173.8 g of ferrous carbonate, 1155.1 g of ammonium dihydrogen phosphate, 1.86 g of boric acid (99.5% by mass fraction) and 371.6 g of lithium carbonate were used in the preparation of the co-doped lithium manganese phosphate inner core.

Example 1-25

The conditions of Example 1-25 were the same as those in Example 1-20, except that in Example 1-25 370.1 g of lithium carbonate, 1.56 g of silicic acid and 1147.7 g of ammonium dihydrogen phosphate were used in the preparation of the co-doped lithium manganese phosphate inner core.

Example 1-26

The conditions of Example 1-26 were the same as those in Example 1-20, except that in Example 1-26 368.3 g of lithium carbonate, 4.9 g of dilute sulfuric acid with a mass fraction of 60%, 919.6 g of manganese carbonate, 224.8 g of ferrous carbonate, 3.7 g of vanadium dichloride, 2.5 g of magnesium carbonate and 1146.8 g of ammonium dihydrogen phosphate were used in the preparation of the co-doped lithium manganese phosphate inner core.

Example 1-27

The conditions of Example 1-27 were the same as those in Example 1-20, except that in Example 1-27 367.9 g of lithium carbonate, 6.5 g of dilute sulfuric acid with a concentration of 60% and 1145.4 g of ammonium dihydrogen phosphate were used in the preparation of the co-doped lithium manganese phosphate inner core.

Examples 1-28 to 1-33

The conditions of Examples 1-28 to 1-33 were the same as those in Example 1-20, except that in Examples 1-28 to 1-33, in the preparation of the co-doped lithium manganese phosphate inner core, 1034.5 g of manganese carbonate, 108.9 g of ferrous carbonate, 3.7 g of vanadium dichloride and 2.5 g of magnesium carbonate were used; the amounts of lithium carbonate used were 367.6 g, 367.2 g, 366.8 g, 366.4 g, 366.0 g and 332.4 g, respectively; the amounts of ammonium dihydrogen phosphate were 1144.5 g, 1143.4 g, 1142.2 g, 1141.1 g, 1139.9 g and 1138.8 g, respectively; and the amounts of dilute sulfuric acid with a concentration of 60% used were 8.2 g, 9.8 g, 11.4 g, 13.1 g, 14.7 g and 16.3 g, respectively.

Example 1-34

Lithium nickel cobalt manganate $LiNi_{0.5}Co_{0.2}Mn_{0.3}O_2$ was used as the positive electrode active material.

Example 1-35

The positive electrode active materials of Example 1-1 and Example 1-34 were mixed in a mass ratio of 1:1.

Example 1-36

Lithium nickel cobalt manganate $LiNi_{0.33}Co_{0.33}Mn_{0.34}O_2$ was used as the positive electrode active material.

Example 1-37

Lithium nickel cobalt manganate $LiNi_{0.8}Co_{0.1}Mn_{0.1}O_2$ was used as the positive electrode active material.

Example 1-38

Lithium nickel cobalt aluminate $LiNi_{0.33}Co_{0.33}Al_{0.34}O_2$ was used as the positive electrode active material.

Example 1-39

Lithium nickel cobalt aluminate $LiNi_{0.5}Co_{0.2}Al_{0.3}O_2$ was used as the positive electrode active material.

Example 1-40

Lithium nickel cobalt aluminate $LiNi_{0.5}Co_{0.1}Al_{0.1}O_2$ was used as the positive electrode active material.

Example 1-41

Lithium cobalt oxide $LiCoO_2$ was used as the positive electrode active material.

Example 1-42

The positive electrode active materials of Example 1 and Example 1-36 were mixed in a mass ratio of 1:1 and used as the positive electrode active material.

Example 1-43

The positive electrode active materials of Example 1-1 and Example 1-37 were mixed in a mass ratio of 1:1 and used as the positive electrode active material.

Example 1-44

The positive electrode active materials of Example 1-1 and Example 1-38 were mixed in a mass ratio of 1:1 and used as the positive electrode active material.

Example 1-45

The positive electrode active materials of Example 1-1 and Example 1-39 were mixed in a mass ratio of 1:1 and used as the positive electrode active material.

Example 1-46

The positive electrode active materials of Example 1-1 and Example 1-40 were mixed in a mass ratio of 1:1 and used as the positive electrode active material.

Example 1-47

The positive electrode active materials of Example 1-1 and Example 1-41 were mixed in a mass ratio of 1:1 and used as the positive electrode active material.

Example 2-1

Except that the sintering temperature in the powder sintering step during the preparation of lithium iron pyrophosphate ($Li_2FeP_2O_7$) was 550° C. the sintering time was 1 h, so that the crystallinity of $Li_2FeP_2O_7$ was controlled to be 30%, and the sintering temperature in the coating sintering step during the preparation of lithium iron phosphate ($LiFePO_4$) was 650° C., the sintering time was 2 h, so that the crystallinity of $LiFePO_4$ was controlled to be 30%, other conditions were the same as those in Example 1-1.

Example 2-2

Except that the sintering temperature in the powder sintering step during the preparation of lithium iron pyrophosphate ($Li_2FeP_2O_7$) was 550° C., the sintering time was 2 h, so that the crystallinity of $Li_2FeP_2O_7$ was controlled to be 50%, and the sintering temperature in the coating sintering step during the preparation of lithium iron phosphate ($LiFePO_4$) was 650° C., the sintering time was 3 h, so that the crystallinity of $LiFePO_4$ was controlled to be 50%, other conditions were the same as those in Example 1-1.

Example 2-3

Except that the sintering temperature in the powder sintering step during the preparation of lithium iron pyrophosphate ($Li_2FeP_2O_7$) was 600° C., the sintering time was 3 h, so that the crystallinity of $Li_2FeP_2O_7$ was controlled to be 70%, and the sintering temperature in the coating sintering step during the preparation of lithium iron phosphate ($LiFePO_4$) was 650° C., the sintering time was 4 h, so that the crystallinity of $LiFePO_4$ was controlled to be 70%, other conditions were the same as those in Example 1-1.

Example 2-4

Except that the sintering temperature in the powder sintering step during the preparation of lithium iron pyrophosphate ($Li_2FeP_2O_7$) was 650° C., the sintering time was 4 h, so that the crystallinity of $Li_2FeP_2O_7$ was controlled to be 100%, and the sintering temperature in the coating sintering step during the preparation of lithium iron phosphate ($LiFePO_4$) was 700° C., the sintering time was 6 h, so that the crystallinity of $LiFePO_4$ was controlled to be 100%, other conditions were the same as those in Example 1-1.

Examples 3-1 to 3-12

Except that in the preparation of Fe, Co and V co-doped manganese oxalate particles, the heating temperature/stirring time in the reaction kettle of Example 3-1 were 60° C./120 minutes respectively; the heating temperature/stirring time in the reaction kettle of Example 3-2 were 70° C./120 minutes respectively; the heating temperature/stirring time in the reaction kettle of Example 3-3 were 80° C./120 minutes respectively; the heating temperature/stirring time in the reaction kettle of Example 3-4 were 90° C./120 minutes respectively; the heating temperature/stirring time in the reaction kettle of Example 3-5 were 100° C./120 minutes respectively; the heating temperature/stirring time in the reaction kettle of Example 3-6 were 110° C./120 minutes respectively; the heating temperature/stirring time in the reaction kettle of Example 3-7 were 120° C./120 minutes respectively; the heating temperature/stirring time in the reaction kettle of Example 3-8 were 130° C./120 minutes respectively; the heating temperature/stirring time in the reaction kettle of Example 3-9 were 100° C./60 minutes respectively; the heating temperature/stirring time in the reaction kettle of Example 3-10 were 100° C./90 minutes respectively; the heating temperature/stirring time in the reaction kettle of Example 3-11 were 100° C./150 minutes respectively; and the heating temperature/stirring time in the reaction kettle of Example 3-12 were 100° C./180 minutes respectively, other conditions of Examples 3-1 to 3-12 were the same as those in Example 1-1.

Examples 4-1 to 4-4

Except that the drying temperatures/drying times in the drying step during the preparation of lithium iron pyrophosphate ($Li_2FeP_2O_7$) were 100° C./4 h, 150° C./6 h, 200° C./6 h and 200° C./6 h respectively; and the sintering temperatures and sintering times in the sintering step during the preparation of lithium iron pyrophosphate ($Li_2FeP_2O_7$) were 700° C./6 h, 700° C./6 h, 700° C./6 h and 600° C./6 h respectively, other conditions were the same as those in Example 1-7.

Examples 4-5 to 4-7

Except that the drying temperatures/drying times in the drying step during the coating process were 150° C./6 h, 150° C./6 h and 150° C./6 h respectively; and the sintering temperatures and sintering times in the sintering step during the coating process were 600° C./4 h, 600° C./6 h and 800° C./8 h respectively, other conditions were the same as those in Example 1-12.

Comparative Example 1

Preparation of manganese oxalate: 1149.3 g of manganese carbonate was added to a reaction kettle, and 5 liters of deionized water and 1260.6 g of oxalic acid dihydrate (calculated as $C_2H_2O_4 \cdot 2H_2O$, the same below) were added. The reaction kettle was heated to 80° C. and stirred at a rotational speed of 600 rpm for 6 hours until the reaction was terminated (no gas bubbles were generated) to obtain a manganese oxalate suspension, and then the suspension was filtered, the filter cake was oven dried at 120° C. and then ground to obtain manganese oxalate dihydrate particles with a median particle diameter Dv50 of 100 nm.

Preparation of carbon-coated lithium manganese phosphate: 1789.6 g of manganese oxalate dihydrate particles obtained above, 369.4 g of lithium carbonate (calculated as $Li_2CO_3$, the same below), 1150.1 g of ammonium dihydrogen phosphate (calculated as $NH_4H_2PO_4$, the same below) and 31 g of sucrose (calculated as $C_{12}H_{22}O_{11}$, the same below) were added to 20 liters of deionized water, and the mixture was stirred for 10 hours to mix well to obtain a slurry. The slurry was transferred to a spray drying device for spray drying and granulation, the drying was set at a temperature of 250° C. for 4 hours to obtain powders. In a protective atmosphere of nitrogen (90 vol %)+hydrogen (10 vol %), the above powders were sintered at 700° C. for 4 hours to obtain the carbon-coated lithium manganese phosphate.

Comparative Example 2

Except that 689.5 g of manganese carbonate was used and 463.3 g of ferrous carbonate was additionally added, other conditions of Comparative example 2 were the same as those in Comparative example 1.

Comparative Example 3

Except that 1148.9 g of ammonium dihydrogen phosphate and 369.0 g of lithium carbonate were used, and 1.6 g of dilute sulfuric acid with a concentration of 60% was additionally added, other conditions of Comparative example 3 were the same as those in Comparative example 1.

Comparative Example 4

Except that 689.5 g of manganese carbonate, 1148.9 g of ammonium dihydrogen phosphate and 369.0 g of lithium carbonate were used, and 463.3 g of ferrous carbonate and 1.6 g of dilute sulfuric acid with a concentration of 60% were additionally added, other conditions of Comparative example 4 were the same as those in Comparative example 1.

Comparative Example 5

Except that the following steps were additionally added: when preparing lithium iron pyrophosphate powders, 9.52 g of lithium carbonate, 29.9 g of ferrous carbonate, 29.6 g of ammonium dihydrogen phosphate and 32.5 g of oxalic acid dihydrate were dissolved in 50 ml deionized water. The pH of the mixture was 5, and the reaction mixture was stirred for 2 hours to fully react. Then the reacted solution was warmed to 80° C. and maintained at this temperature for 4 hours to obtain a suspension comprising $Li_2FeP_2O_7$, which was filtered, washed with deionized water and dried at 120° C. for 4 h to obtain powders. The powders were sintered at 500° C. under a nitrogen atmosphere for 4 hours, cooled naturally to room temperature and then ground, the crystallinity of $Li_2FeP_2O_7$ was controlled to be 5%, and the amount of $Li_2FeP_2O_7$ used when preparing the carbon-coated material was 62.8 g, other conditions of Comparative example 5 were the same as those in Comparative example 4.

Comparative Example 6

Except that the following steps were additionally added: when preparing lithium iron phosphate suspension, 14.7 g of lithium carbonate, 46.1 g of ferrous carbonate, 45.8 g of ammonium dihydrogen phosphate and 50.2 g of oxalic acid dihydrate were dissolved in 500 ml of deionized water, and then the mixture was stirred for 6 hours to fully react. Then the reacted solution was warmed to 120° C. and maintained at this temperature for 6 hours to obtain a suspension comprising $LiFePO_4$, the sintering temperature in the coating sintering step during the preparation of lithium iron phosphate ($LiFePO_4$) was 600° C. the sintering time was 4 h, so that the crystallinity of $LiFePO_4$ was controlled to be 8%, and the amount of $LiFePO_4$ used when preparing the carbon-coated material was 62.8 g, other conditions of Comparative example 6 were the same as in Comparative example 4.

Comparative Example 7

Preparation of lithium iron pyrophosphate powders: 2.38 g of lithium carbonate, 7.5 g of ferrous carbonate, 7.4 g of ammonium dihydrogen phosphate and 8.1 g of oxalic acid dihydrate were dissolved in 50 ml of deionized water. The pH of the mixture was 5, and the reaction mixture was stirred for 2 hours to fully react. Then the reacted solution was warmed to 80° C. and maintained at this temperature for 4 hours to obtain a suspension comprising $Li_2FeP_2O_7$, which was filtered, washed with deionized water and dried at 120° C. for 4 h to obtain powders. The powders were sintered at 500° C. under a nitrogen atmosphere for 4 hours, cooled naturally to room temperature and then ground, and the crystallinity of $Li_2FeP_2O_7$ was controlled to be 5%.

Preparation of lithium iron phosphate suspension: 11.1 g of lithium carbonate, 34.7 g of ferrous carbonate, 34.4 g of ammonium dihydrogen phosphate, 37.7 g of oxalic acid dihydrate and 37.3 g of sucrose (calculated as $C_{12}H_{22}O_{11}$, the same below) were dissolved in 1500 ml of deionized water, and then the mixture was stirred for 6 hours to fully react. Then the reacted solution was warmed to 120° C. and maintained at this temperature for 6 hours to obtain a suspension comprising $LiFePO_4$.

15.7 g of the obtained lithium iron pyrophosphate powders were added to the above-mentioned suspension of lithium iron phosphate ($LiFePO_4$) and sucrose, and except that in the coating sintering step during the preparation process, the sintering temperature was 600° C., and the sintering time was 4 h, so that the crystallinity of $LiFePO_4$ was controlled to be 8%, other conditions of Comparative example 7 were the same as those in Comparative example 4, and an amorphous lithium iron pyrophosphate, an amorphous lithium iron phosphate, and a carbon-coated positive electrode active material were obtained.

Comparative Examples 8-11

Except that the drying temperature/drying time in the drying step during the preparation of lithium iron pyrophosphate ($Li_2FeP_2O_7$) were 80° C./3 h, 80° C./3 h and 80° C./3 h respectively in Comparative examples 8-10; the sintering temperature and sintering time in the sintering step during the preparation of lithium iron pyrophosphate ($Li_2FeP_2O_7$) were 400° C./3 h, 400° C./3 h and 350° C./2 h respectively in Comparative examples 8-10; the drying temperature/drying time in the drying step during the preparation of lithium iron phosphate ($LiFePO_4$) were 80° C./3 h in Comparative example 11; and the amounts of $Li_2FeP_2O_7$/$LiFePO_4$ used in Comparative examples 8-11 were 47.2 g/15.7 g, 15.7 g/47.2 g, 62.8 g/0 g, 0 g/62.8 g respectively, other conditions were the same as those in Example 1-7.

The positive electrode active material prepared above, a conductive agent superconducting carbon black (Super-P), and a binder polyvinylidene fluoride (PVDF) were added to N-methyl pyrrolidone (NMP) in a weight ratio of 92:2.5:5.5, stirred and mixed uniformly to obtain a slurry of positive electrode active material with a solid content of 60% w/w.

Preparation of Positive Electrode Sheet

Example 5-1

The slurry of positive electrode active material of Example 1-1 was uniformly coated on both sides of the current collector aluminum foil at a coating amount of 0.019 g/cm², vacuum dried at a high temperature of 100~120° C. for 14 h, and compacted by a roller press to obtain a positive electrode sheet P1.

Example 5-2

The slurry of positive electrode active material of Example 1-34 was uniformly coated on both sides of the current collector aluminum foil at a coating amount of 0.019 g/cm², vacuum dried at a high temperature of 100~120° C. for 14 h, and compacted by a roller press to obtain a positive electrode sheet P2.

Example 5-3

The slurry of positive electrode active material of Example 1-1 was uniformly coated on one side of the aluminum foil at a coating amount of 0.019 g/cm², the slurry of positive electrode active material of Example 1-34 was uniformly coated on the other side of the aluminum foil at a coating amount of 0.019 g/cm², vacuum dried at a high temperature of 100~120° C. for 14 h, and compacted by a roller press to obtain a positive electrode sheet P3.

Example 5-4

The slurry of positive electrode active material of Example 1-35 was uniformly coated on both sides of the current collector aluminum foil at a coating amount of 0.019 g/cm², and other procedures were the same as those in Example 5-3, and a positive electrode sheet P4 was obtained.

Example 5-5

The slurry of positive electrode active material of Example 1-1 was uniformly coated on one side of the aluminum foil at a coating amount of 0.019 g/cm², the slurry of positive electrode active material of Example 1-35 was uniformly coated on the other side of the aluminum foil at a coating amount of 0.019 g/cm², and other procedures were the same as those in Example 5-3, and a positive electrode sheet P5 was obtained.

Example 5-6

The slurry of positive electrode active material of Example 1-34 was uniformly coated on one side of the aluminum foil at a coating amount of 0.019 g/cm², the slurry of positive electrode active material of Example 1-35 was uniformly coated on the other side of the aluminum foil at a coating amount of 0.019 g/cm², and other procedures were the same as those in Example 5-3, and a positive electrode sheet P6 was obtained.

Example 5-7

Both sides of the aluminum foil were coated sequentially with the slurry of positive electrode active material of Example 1-1 and the slurry of positive electrode active material of Example 1-34, with the coating amount of each slurry layer being 0.010 g/cm², and then vacuum dried at a high temperature of 100~120° C. for 14 h, and compacted by a roller press to obtain a positive electrode sheet P7.

Example 5-8

Both sides of the aluminum foil were coated sequentially with the slurry of positive electrode active material of Example 1-34 and the slurry of positive electrode active material of Example 1-1, the coating amount of each slurry layer was 0.010 g/cm², and other procedures were the same as those in Example 5-7, and a positive electrode sheet P8 was obtained.

Example 5-9

Both sides of the aluminum foil were coated sequentially with the slurry of positive electrode active material of Example 1-1 and the slurry of positive electrode active material of Example 1-35, the coating amount of each slurry layer was 0.010 g/cm², and other procedures were the same as those in Example 5-7, and a positive electrode sheet P9 was obtained.

Example 5-10

Both sides of the aluminum foil were coated sequentially with the slurry of positive electrode active material of Example 1-35 and the slurry of positive electrode active material of Example 1-1, the coating amount of each slurry layer was 0.010 g/cm², and other procedures were the same as those in Example 5-7, and a positive electrode sheet P10 was obtained.

Example 5-11

Both sides of the aluminum foil were coated sequentially with the slurry of positive electrode active material of Example 1-34 and the slurry of positive electrode active material of Example 1-35, the coating amount of each slurry layer was 0.010 g/cm², and other procedures were the same as those in Example 5-7, and a positive electrode sheet P11 was obtained.

Example 5-12

Both sides of the aluminum foil were coated sequentially with the slurry of positive electrode active material of Example 1-35 and the slurry of positive electrode active material of Example 1-34, the coating amount of each slurry layer was 0.010 g/cm², and other procedures were the same as those in Example 5-7, and a positive electrode sheet P12 was obtained.

Example 5-13

The A side of the aluminum foil was coated sequentially with the slurry of positive electrode active material of Example 1-1 and the slurry of positive electrode active material of Example 1-34, with the coating amount of each slurry layer being 0.010 g/cm², the B side of the aluminum foil was coated uniformly with the slurry of positive electrode active material of Example 1-1 at a coating amount of 0.020 g/cm², and then vacuum dried at a high temperature of 100~120° C. for 14 h, and compacted by a roller press to obtain a positive electrode sheet P13.

Example 5-14

The A side of the aluminum foil was coated sequentially with the slurry of positive electrode active material of Example 1-1 and the slurry of positive electrode active material of Example 1-34, with the coating amount of each slurry layer being 0.010 g/cm², the B side of the aluminum foil was coated uniformly with the slurry of positive electrode active material of Example 1-34 at a coating amount of 0.020 g/cm², and other procedures were the same as those in Example 5-13, and a positive electrode sheet P14 was obtained.

Example 5-15

The A side of the aluminum foil was coated sequentially with the slurry of positive electrode active material of Example 1-1 and the slurry of positive electrode active material of Example 1-34, with the coating amount of each slurry layer being 0.010 g/cm², the B side of the aluminum foil was coated uniformly with the slurry of positive electrode active material of Example 1-35 at a coating amount of 0.020 g/cm², and other procedures were the same as those in Example 5-13, and a positive electrode sheet P15 was obtained.

Example 5-16

The A side of the aluminum foil was coated sequentially with the slurry of positive electrode active material of Example 1-34 and the slurry of positive electrode active material of Example 1-1, with the coating amount of each slurry layer being 0.010 g/cm², the B side of the aluminum foil was coated uniformly with the slurry of positive electrode active material of Example 1-1 at a coating amount of 0.020 g/cm², and other procedures were the same as those in Example 5-13, and a positive electrode sheet P16 was obtained.

Example 5-17

The A side of the aluminum foil was coated sequentially with the slurry of positive electrode active material of Example 1-34 and the slurry of positive electrode active material of Example 1-1, with the coating amount of each slurry layer being 0.010 g/cm², the B side of the aluminum foil was coated uniformly with the slurry of positive electrode active material of Example 1-34 at a coating amount of 0.020 g/cm², and other procedures were the same as those in Example 5-13, and a positive electrode sheet P17 was obtained.

Example 5-18

The A side of the aluminum foil was coated sequentially with the slurry of positive electrode active material of Example 1-34 and the slurry of positive electrode active material of Example 1-1, with the coating amount of each slurry layer being 0.010 g/cm², the B side of the aluminum foil was coated uniformly with the slurry of positive electrode active material of Example 1-35 at a coating amount of 0.020 g/cm², and other procedures were the same as those in Example 5-13, and a positive electrode sheet P18 was obtained.

Example 5-19

The A side of the aluminum foil was coated sequentially with the slurry of positive electrode active material of Example 1-1 and the slurry of positive electrode active material of Example 1-35, with the coating amount of each slurry layer being 0.010 g/cm², the B side of the aluminum foil was coated uniformly with the slurry of positive electrode active material of Example 1-1 at a coating amount of 0.020 g/cm², and other procedures were the same as those in Example 5-13, and a positive electrode sheet P19 was obtained.

Example 5-20

The A side of the aluminum foil was coated sequentially with the slurry of positive electrode active material of Example 1-1 and the slurry of positive electrode active material of Example 1-35, with the coating amount of each slurry layer being 0.010 g/cm², the B side of the aluminum foil was coated uniformly with the slurry of positive electrode active material of Example 1-34 at a coating amount of 0.020 g/cm², and other procedures were the same as those in Example 5-13, and a positive electrode sheet P20 was obtained.

Example 5-21

The A side of the aluminum foil was coated sequentially with the slurry of positive electrode active material of Example 1-1 and the slurry of positive electrode active material of Example 1-35, with the coating amount of each slurry layer being 0.010 g/cm², the B side of the aluminum foil was coated uniformly with the slurry of positive electrode active material of Example 1-35 at a coating amount of 0.020 g/cm², and other procedures were the same as those in Example 5-13, and a positive electrode sheet P21 was obtained.

Example 5-22

The A side of the aluminum foil was coated sequentially with the slurry of positive electrode active material of Example 1-35 and the slurry of positive electrode active material of Example 1-1, with the coating amount of each slurry layer being 0.010 g/cm², the B side of the aluminum foil was coated uniformly with the slurry of positive electrode active material of Example 1-1 at a coating amount of 0.020 g/cm², and other procedures were the same as those in Example 5-13, and a positive electrode sheet P22 was obtained.

Example 5-23

The A side of the aluminum foil was coated sequentially with the slurry of positive electrode active material of Example 1-35 and the slurry of positive electrode active material of Example 1-1, with the coating amount of each slurry layer being 0.010 g/cm², the B side of the aluminum foil was coated uniformly with the slurry of positive electrode active material of Example 1-34 at a coating amount of 0.020 g/cm², and other procedures were the same as those in Example 5-13, and a positive electrode sheet P23 was obtained.

Example 5-24

The A side of the aluminum foil was coated sequentially with the slurry of positive electrode active material of Example 1-35 and the slurry of positive electrode active material of Example 1-1, with the coating amount of each slurry layer being 0.010 g/cm², the B side of the aluminum foil was coated uniformly with the slurry of positive electrode active material of Example 1-35 at a coating amount of 0.020 g/cm², and other procedures were the same as those in Example 5-13, and a positive electrode sheet P24 was obtained.

Example 5-25

The A side of the aluminum foil was coated sequentially with the slurry of positive electrode active material of Example 1-34 and the slurry of positive electrode active material of Example 1-35, with the coating amount of each slurry layer being 0.010 g/cm², the B side of the aluminum foil was coated uniformly with the slurry of positive electrode active material of Example 1-1 at a coating amount of 0.020 g/cm², and other procedures were the same as those in Example 5-13, and a positive electrode sheet P25 was obtained.

Example 5-26

The A side of the aluminum foil was coated sequentially with the slurry of positive electrode active material of Example 1-34 and the slurry of positive electrode active material of Example 1-35, with the coating amount of each slurry layer being 0.010 g/cm², the B side of the aluminum foil was coated uniformly with the slurry of positive electrode active material of Example 1-34 at a coating amount of 0.020 g/cm², and other procedures were the same as those in Example 5-13, and a positive electrode sheet P26 was obtained.

Example 5-27

The A side of the aluminum foil was coated sequentially with the slurry of positive electrode active material of Example 1-34 and the slurry of positive electrode active material of Example 1-35, with the coating amount of each slurry layer being 0.010 g/cm², the B side of the aluminum foil was coated uniformly with the slurry of positive electrode active material of Example 1-35 at a coating amount of 0.020 g/cm², and other procedures were the same as those in Example 5-13, and a positive electrode sheet P27 was obtained.

Example 5-28

The A side of the aluminum foil was coated sequentially with the slurry of positive electrode active material of Example 1-35 and the slurry of positive electrode active material of Example 1-34, with the coating amount of each slurry layer being 0.010 g/cm², the B side of the aluminum foil was coated uniformly with the slurry of positive electrode active material of Example 1-1 at a coating amount of 0.020 g/cm², and other procedures were the same as those in Example 5-13, and a positive electrode sheet P28 was obtained.

Example 5-29

The A side of the aluminum foil was coated sequentially with the slurry of positive electrode active material of Example 1-35 and the slurry of positive electrode active material of Example 1-34, with the coating amount of each slurry layer being 0.010 g/cm², the B side of the aluminum foil was coated uniformly with the slurry of positive electrode active material of Example 1-34 at a coating amount of 0.020 g/cm², and other procedures were the same as those in Example 5-13, and a positive electrode sheet P29 was obtained.

Example 5-30

The A side of the aluminum foil was coated sequentially with the slurry of positive electrode active material of Example 1-35 and the slurry of positive electrode active material of Example 1-34, with the coating amount of each slurry layer being 0.010 g/cm², the B side of the aluminum foil was coated uniformly with the slurry of positive electrode active material of Example 1-35 at a coating amount of 0.020 g/cm², and other procedures were the same as those in Example 5-13, and a positive electrode sheet P30 was obtained.

Example 5-31

The slurry of positive electrode active material of Example 1-36 was uniformly coated on both sides of the current collector aluminum foil at a coating amount of 0.019 g/cm², vacuum dried at a high temperature of 100-120° C. for 14 h, and compacted by a roller press to obtain a positive electrode sheet P31.

Example 5-32

The slurry of positive electrode active material of Example 1-37 was uniformly coated on both sides of the current collector aluminum foil at a coating amount of 0.019 g/cm², vacuum dried at a high temperature of 100-120° C. for 14 h, and compacted by a roller press to obtain a positive electrode sheet P32.

Example 5-33

The slurry of positive electrode active material of Example 1-38 was uniformly coated on both sides of the current collector aluminum foil at a coating amount of 0.019 g/cm², vacuum dried at a high temperature of 100~120° C. for 14 h, and compacted by a roller press to obtain a positive electrode sheet P33.

Example 5-34

The slurry of positive electrode active material of Example 1-39 was uniformly coated on both sides of the current collector aluminum foil at a coating amount of 0.019 g/cm², vacuum dried at a high temperature of 100~120° C. for 14 h, and compacted by a roller press to obtain a positive electrode sheet P34.

Example 5-35

The slurry of positive electrode active material of Example 1-40 was uniformly coated on both sides of the current collector aluminum foil at a coating amount of 0.019 g/cm², vacuum dried at a high temperature of 100~120° C. for 14 h, and compacted by a roller press to obtain a positive electrode sheet P35.

Example 5-36

The slurry of positive electrode active material of Example 1-41 was uniformly coated on both sides of the current collector aluminum foil at a coating amount of 0.019 g/cm², vacuum dried at a high temperature of 100~120° C. for 14 h, and compacted by a roller press to obtain a positive electrode sheet P36.

Example 5-37

The slurry of positive electrode active material of Example 1-42 was uniformly coated on both sides of the current collector aluminum foil at a coating amount of 0.019 g/cm², and other procedures were the same as those in Example 5-3, and a positive electrode sheet P37 was obtained.

Example 5-38

The slurry of positive electrode active material of Example 1-43 was uniformly coated on both sides of the current collector aluminum foil at a coating amount of 0.019 g/cm², and other procedures were the same as those in Example 5-3, and a positive electrode sheet P38 was obtained.

Example 5-39

The slurry of positive electrode active material of Example 1-44 was uniformly coated on both sides of the current collector aluminum foil at a coating amount of 0.019 g/cm², and other procedures were the same as those in Example 5-3, and a positive electrode sheet P39 was obtained.

Example 5-40

The slurry of positive electrode active material of Example 1-45 was uniformly coated on both sides of the current collector aluminum foil at a coating amount of 0.019 g/cm², and other procedures were the same as those in Example 5-3, and a positive electrode sheet P40 was obtained.

Example 5-41

The slurry of positive electrode active material of Example 1-46 was uniformly coated on both sides of the current collector aluminum foil at a coating amount of 0.019 g/cm², and other procedures were the same as those in Example 5-3, and a positive electrode sheet P41 was obtained.

Example 5-42

The slurry of positive electrode active material of Example 1-47 was uniformly coated on both sides of the current collector aluminum foil at a coating amount of 0.019 g/cm², and other procedures were the same as those in Example 5-3, and a positive electrode sheet P42 was obtained.

The parameters of the above positive electrode sheets are shown in Table 1.

TABLE 1

Parameters of positive electrode sheets

| | Number of positive electrode film layers on A side of aluminum foil | Positive electrode active material on A side of aluminum foil | Number of positive electrode film layers on B side of aluminum foil | Positive electrode active material on B side of aluminum foil | Thickness of positive electrode sheet (mm) | Density of positive electrode sheet (g/cm3) | Mass content of first positive electrode active material in positive electrode active material # | Mass content of second positive electrode active material in positive electrode active material # |
|---|---|---|---|---|---|---|---|---|
| Positive electrode sheet P1 | 1 | Example 1-1 | 1 | Example 1-1 | 0.168 | 2.50 | 100% | — |
| Positive electrode sheet P2 | 1 | Example 1-34 | 1 | Example 1-34 | 0.138 | 3.10 | — | 100% |
| Positive electrode sheet P3 | 1 | Example 1-1 | 1 | Example 1-34 | 0.169 | 2.50 | 50% | 50% |
| Positive electrode sheet P4 | 1 | Example 1-35 | 1 | Example 1-35 | 0.151 | 2.80 | 50% | 50% |
| Positive electrode sheet P5 | 1 | Example 1-1 | 1 | Example 1-35 | 0.168 | 2.50 | 75% | 25% |
| Positive electrode sheet P6 | 1 | Example 1-34 | 1 | Example 1-35 | 0.145 | 2.95 | 25% | 75% |
| Positive electrode sheet P7 | 2 | Layer 1*: Example 1-1 Layer 2*: Example 1-34 | 2 | Layer 1: Example 1-1 Layer 2: Example 1-34 | 0.169 | 2.50 | 50% | 50% |

TABLE 1-continued

Parameters of positive electrode sheets

| | Number of positive electrode film layers on A side of aluminum foil | Positive electrode active material on A side of aluminum foil | Number of positive electrode film layers on B side of aluminum foil | Positive electrode active material on B side of aluminum foil | Thickness of positive electrode sheet (mm) | Density of positive electrode sheet (g/cm3) | Mass content of first positive electrode active material in positive electrode active material # | Mass content of second positive electrode active material in positive electrode active material # |
|---|---|---|---|---|---|---|---|---|
| Positive electrode sheet P8 | 2 | Layer 1: Example 1-34 Layer 2: Example 1-1 | 2 | Layer 1: Example 1-34 Layer 2: Example 1-1 | 0.169 | 2.50 | 50% | 50% |
| Positive electrode sheet P9 | 2 | Layer 1: Example 1-1 Layer 2: Example 1-35 | 2 | Layer 1: Example 1-1 Layer 2: Example 1-35 | 0.168 | 2.50 | 75% | 25% |
| Positive electrode sheet P10 | 2 | Layer 1: Example 1-35 Layer 2: Example 1-1 | 2 | Layer 1: Example 1-35 Layer 2: Example 1-1 | 0.161 | 2.65 | 75% | 25% |
| Positive electrode sheet P11 | 2 | Layer 1: Example 1-34 Layer 2: Example 1-35 | 2 | Layer 1: Example 1-34 Layer 2: Example 1-35 | 0.145 | 2.95 | 25% | 75% |
| Positive electrode sheet P12 | 2 | Layer 1: Example 1-35 Layer 2: Example 1-34 | 2 | Layer 1: Example 1-35 Layer 2: Example 1-34 | 0.145 | 2.95 | 25% | 75% |
| Positive electrode sheet P13 | 2 | Layer 1: Example 1-1 Layer 2: Example 1-34 | 1 | Example 1-1 | 0.168 | 2.50 | 75% | 25% |
| Positive electrode sheet P14 | 2 | Layer 1: Example 1-1 Layer 2: Example 1-34 | 1 | Example 1-34 | 0.168 | 2.50 | 25% | 75% |
| Positive electrode sheet P15 | 2 | Layer 1: Example 1-1 Layer 2: Example 1-34 | 1 | Example 1-35 | 0.169 | 2.50 | 50% | 50% |
| Positive electrode sheet P16 | 2 | Layer 1: Example 1-34 Layer 2: Example 1-1 | 1 | Example 1-1 | 0.168 | 2.50 | 75% | 25% |
| Positive electrode sheet P17 | 2 | Layer 1: Example 1-34 Layer 2: Example 1-1 | 1 | Example 1-34 | 0.145 | 2.95 | 25% | 75% |
| Positive electrode sheet P18 | 2 | Layer 1: Example 1-34 Layer 2: Example 1-1 | 1 | Example 1-35 | 0.151 | 2.80 | 50% | 50% |

TABLE 1-continued

Parameters of positive electrode sheets

| | Number of positive electrode film layers on A side of aluminum foil | Positive electrode active material on A side of aluminum foil | Number of positive electrode film layers on B side of aluminum foil | Positive electrode active material on B side of aluminum foil | Thickness of positive electrode sheet (mm) | Density of positive electrode sheet (g/cm3) | Mass content of first positive electrode active material in positive electrode active material # | Mass content of second positive electrode active material in positive electrode active material # |
|---|---|---|---|---|---|---|---|---|
| Positive electrode sheet P19 | 2 | Layer 1: Example 1-1 Layer 2: Example 1-35 | 1 | Example 1-1 | 0.168 | 2.50 | 87.5% | 12.5% |
| Positive electrode sheet P20 | 2 | Layer 1: Example 1-1 Layer 2: Example 1-35 | 1 | Example 1-34 | 0.169 | 2.50 | 37.5% | 62.5% |
| Positive electrode sheet P21 | 2 | Layer 1: Example 1-1 Layer 2: Example 1-35 | 1 | Example 1-35 | 0.168 | 2.50 | 62.5% | 37.5% |
| Positive electrode sheet P22 | 2 | Layer 1: Example 1-35 Layer 2: Example 1-1 | 1 | Example 1-1 | 0.168 | 2.50 | 87.5% | 12.5% |
| Positive electrode sheet P23 | 2 | Layer 1: Example 1-35 Layer 2: Example 1-1 | 1 | Example 1-34 | 0.148 | 2.88 | 37.5% | 62.5% |
| Positive electrode sheet P24 | 2 | Layer 1: Example 1-35 Layer 2: Example 1-1 | 1 | Example 1-35 | 0.155 | 2.73 | 62.5% | 37.5% |
| Positive electrode sheet P25 | 2 | Layer 1: Example 1-34 Layer 2: Example 1-35 | 1 | Example 1-1 | 0.168 | 2.50 | 62.5% | 37.5% |
| Positive electrode sheet P26 | 2 | Layer 1: Example 1-34 Layer 2: Example 1-35 | 1 | Example 1-34 | 0.142 | 3.03 | 12.5% | 87.5% |
| Positive electrode sheet P27 | 2 | Layer 1: Example 1-34 Layer 2: Example 1-35 | 1 | Example 1-35 | 0.148 | 2.88 | 37.5% | 62.5% |
| Positive electrode sheet P28 | 2 | Layer 1: Example 1-35 Layer 2: Example 1-34 | 1 | Example 1-1 | 0.168 | 2.50 | 62.5% | 37.5% |
| Positive electrode sheet P29 | 2 | Layer 1: Example 1-35 Layer 2: Example 1-34 | 1 | Example 1-34 | 0.142 | 3.03 | 12.5% | 87.5% |

TABLE 1-continued

Parameters of positive electrode sheets

| | Number of positive electrode film layers on A side of aluminum foil | Positive electrode active material on A side of aluminum foil | Number of positive electrode film layers on B side of aluminum foil | Positive electrode active material on B side of aluminum foil | Thickness of positive electrode sheet (mm) | Density of positive electrode sheet (g/cm3) | Mass content of first positive electrode active material in positive electrode active material # | Mass content of second positive electrode active material in positive electrode active material # |
|---|---|---|---|---|---|---|---|---|
| Positive electrode sheet P30 | 2 | Layer 1: Example 1-35 Layer 2: Example 1-34 | 1 | Example 1-35 | 0.148 | 2.88 | 37.5% | 62.5% |
| Positive electrode sheet P31 | 1 | Example 1-36 | 1 | Example 1-36 | 0.138 | 3.1 | — | 100% |
| Positive electrode sheet P32 | 1 | Example 1-37 | 1 | Example 1-37 | 0.138 | 3.1 | — | 100% |
| Positive electrode sheet P33 | 1 | Example 1-38 | 1 | Example 1-38 | 0.138 | 3.1 | — | 100% |
| Positive electrode sheet P34 | 1 | Example 1-39 | 1 | Example 1-39 | 0.138 | 3.1 | — | 100% |
| Positive electrode sheet P35 | 1 | Example 1-40 | 1 | Example 1-40 | 0.138 | 3.1 | — | 100% |
| Positive electrode sheet P36 | 1 | Example 1-41 | 1 | Example 1-41 | 0.138 | 3.1 | — | 100% |
| Positive electrode sheet P37 | 1 | Example 1-42 | 1 | Example 1-42 | 0.151 | 2.8 | 50% | 50% |
| Positive electrode sheet P38 | 1 | Example 1-43 | 1 | Example 1-43 | 0.151 | 2.8 | 50% | 50% |
| Positive electrode sheet P39 | 1 | Example 1-44 | 1 | Example 1-44 | 0.151 | 2.8 | 50% | 50% |
| Positive electrode sheet P40 | 1 | Example 1-45 | 1 | Example 1-45 | 0.151 | 2.8 | 50% | 50% |
| Positive electrode sheet P41 | 1 | Example 1-46 | 1 | Example 1-46 | 0.151 | 2.8 | 50% | 50% |
| Positive electrode sheet P42 | 1 | Example 1-47 | 1 | Example 1-47 | 0.151 | 2.8 | 50% | 50% |

"*": The layer 1 refers to the layer in contact with the surface of the aluminum foil, and the layer 2 refers to the layer provided on the layer 1.
"#": The first positive electrode active material is the positive electrode active material prepared in Example 1-1, and the second positive electrode active material is the positive electrode active material of Example 1-34, Example 1-36, Example 1-37, Example 1-38, Example 1-39, Example 1-40 or Example 1-41.

Preparation of Negative Electrode Sheet

The negative electrode active material artificial graphite, a conductive agent superconducting carbon black (Super-P), a binder styrene butadiene rubber (SBR) and a thickener sodium carboxymethyl cellulose (CMC-Na) were dissolved in deionized water in a mass ratio of 95%:1.5%:1.8%:1.7%, and after sufficient stirring and mixing uniformly, a negative electrode slurry with a viscosity of 3000 mPa·s and a solid content of 52% was obtained; the negative electrode slurry was coated on a 6 μm negative electrode current collector copper foil, followed by baking at 100° C. for 4 hours to dry and roll-pressing to obtain a negative electrode sheet having a compaction density of 1.75 g/cm³.

Separator

A polypropylene film was used.

Preparation of Electrolyte Solution

Ethylene carbonate, dimethyl carbonate and 1,2-propylene glycol carbonate were mixed in a volume ratio of 1:1:1, and then $LiPF_6$ was uniformly dissolved in the above solution to obtain an electrolyte solution. The concentration of $LiPF_6$ in this electrolyte solution is 1 mol/L.

Preparation of Full Battery

The above positive electrode sheet was used, and according to the sequence of the negative electrode sheet, the separator and the positive electrode sheet, a bare battery cell was formed by a winding process, and an aluminum tab and a copper tab were respectively punched out to obtain a bare battery cell; both the copper together with the copper tab and the aluminum together with the aluminum tab of the bare battery cell were welded to the top cover of the battery through an adapter piece; after wrapping and insulating the bare battery cell, the bare battery cell was put into an aluminum case, and the top cover and the aluminum case were welded to form a dry battery cell; and after baking the dry battery cell to remove water, the electrolyte solution was injected, and the battery was subjected to formation and ageing to obtain a full battery accordingly. Here, the battery structures made with the positive electrode sheets P1, P2, P3, P8, P10, P11, P12, P17, P18, P23, P24, P26 and P27 are shown in FIGS. 8-20.

Preparation of Button-Type Battery

The positive electrode active material prepared above, PVDF and acetylene black were added to NMP in a weight ratio of 90:5:5, and stirred in a drying room to make a slurry. The above slurry was coated on an aluminum foil, dried and cold-pressed to form a positive electrode sheet. The coating amount was 0.2 g/cm$^2$, and the compaction density was 2.0 g/cm$^3$.

A lithium sheet was used as the negative electrode, and a solution of 1 mol/L LiPF$_6$ in ethylene carbonate (EC)+ diethyl carbonate (DEC)+dimethyl carbonate (DMC) with a volume ratio of 1:1:1 was used as the electrolyte solution, which was assembled together with the positive electrode sheet prepared above in a button cell box to form a button-type battery (hereinafter also referred to as "button cell").

Performance Test of Positive Electrode Active Material

1. Determination of the Chemical Formula of the Inner Core and the Compositions of Different Coating Layers:

A spherical aberration electron microscope (ACSTEM) was used to characterize the internal microstructure and surface structure of the positive electrode active material with high spatial resolution, and combined with three-dimensional reconstruction technology to obtain the chemical formula of the inner core of the positive electrode active material and the compositions of the first and second coating layers.

2. Test of the Initial Gram Capacity of the Button-Type Battery:

At 2.5~4.3V, the button-type battery prepared above was charged at 0.1 C to 4.3V, then charged at constant voltage of 4.3V to a current of less than or equal to 0.05 mA, allowed to stand for 5 min, and then discharged at 0.1 C to 2.0V, at which time the discharge capacity was the initial gram capacity, recorded as D0.

3. Test of the Average Discharge Voltage (V) of the Button Cell:

The button-type battery prepared above was allowed to stand for 5 min in a constant temperature environment of 25° C., discharged at 0.1 C to 2.5V, allowed to stand for 5 min, charged at 0.1 C to 4.3V, then charged at constant voltage of 4.3V to a current of less than or equal to 0.05 mA, and allowed to stand for 5 min; and then discharged at 0.1 C to 2.5V, at which time the discharge capacity was the initial gram capacity, recorded as D0, the discharge energy was the initial energy, recorded as E0, and the average discharge voltage V of the button cell was E0/D0.

4. Test of Full Battery Inflation at 60° C.:

The full battery prepared above at 100% state of charge (SOC) was stored at 60° C. The open-circuit voltage (OCV) and alternating current internal resistance (IMP) of the battery cell were measured before, after and during storage to monitor the SOC and measure the volume of the battery cell. Here, the full battery was taken out after every 48 h of storage, allowed to stand for 1 h, then the open-circuit voltage (OCV) and internal resistance (IMP) were tested, and the volume of the battery cell was measured by water displacement method after cooling to room temperature. In the water displacement method, the gravity $F_1$ of the battery cell was first measured with a balance that automatically performs unit conversion of the dial data, then the battery cell was completely placed in deionized water (the density was known to be 1 g/cm$^3$), the gravity $F_2$ of the battery cell at this time was measured, the buoyancy $F_{float}$ was $F_1-F_2$, and then according to Archimedes principle $F_{float}=\rho \times g \times V_{displacement}$, the volume of the battery cell was calculated, i.e. $V=(F_1-F_2)/(\rho \times g)$.

From the OCV and IMP test results, it can be seen that the SOC of the batteries of all Examples remained above 99% during the experiment until the end of storage.

After 30 days of storage, the battery cell volume was measured, and the percentage increase in the battery cell volume after storage relative to the battery cell volume before storage was calculated.

Additionally, the residual capacity of the battery cell was measured. At 2.5~4.3V, the full battery was charged at 1 C to 4.3V, and then charged at constant voltage of 4.3V to a current of less than or equal to 0.05 mA. After standing for 5 min, the charge capacity at the time was recorded as the residual capacity of the battery cell.

5. Cycling Performance Test of the Full Battery at 45° C.:

In a constant temperature environment of 45° C. and at 2.5-4.3V, the full battery prepared above was charged at 1 C to 4.3V, and then charged at constant voltage of 4.3V to a current of less than or equal to 0.05 mA. After standing for 5 min and then discharged at 1 C to 2.5V, the discharge capacity at the time was recorded as D0. The charge-discharge cycle was repeated, until the discharge capacity was reduced to 80% of D0. The number of cycles passed by the battery at this time was recorded.

6. Test of the Lattice Change Rate:

In a constant temperature environment of 25° C., the sample of the positive electrode active material prepared above was placed in XRD (model Bruker D8 Discover), the sample was tested at 1°/min, and the test data were sorted and analyzed. With reference to standard PDF cards, the lattice constants a0, b0, c0 and v0 at this time were calculated (a0, b0 and c0 represent the length sizes in various aspects of the unit cell, and v0 represents the unit cell volume, which could be directly obtained by XRD refinement results).

By the above method for preparing button cell, the sample of the positive electrode active material was prepared into a button cell, and the above button cell was charged at a small rate of 0.05 C. until the current was reduced to 0.01 C. Then the positive electrode sheet in the button cell was taken out and soaked in dimethyl carbonate (DMC) for 8 hours. Then it was oven dried, scraped, and screened for particles having a particle diameter less than 500 nm. A sample was taken and its unit cell volume v1 was calculated in the same way as for the fresh sample tested above, and (v0−v1)/v0×100% is shown in the Table as its lattice change rate (unit cell volume change rate) before and after complete lithium deintercalation.

7. Test of Li/Mn Antisite Defect Concentration

The Li/Mn antisite defect concentration was obtained by comparing the XRD results tested in the "Lattice Change Rate Measurement Method" with the PDF (Powder Diffraction File) card of the standard crystal. Specifically, the XRD results tested in the "Lattice Change Rate Measurement Method" were imported into the General Structural Analysis System (GSAS) software, and the refined results were automatically obtained, including the occupancy of different atoms, and the Li/Mn antisite defect concentration was obtained by reading the refined results.

8. Test of Transition Metal Dissolution:

A full battery cycled at 45° C. until the capacity was attenuated to 80% was discharged at a rate of 0.1 C to a cut-off voltage of 2.0V. Then the battery was disassembled, the negative electrode sheet was taken out, 30 discs with a unit area (1540.25 mm$^2$) were randomly taken on the negative electrode sheet, and tested for inductively coupled plasma emission spectrum (ICP) with Agilent ICP-OES730. According to the ICP results, the amounts of Fe (if the Mn position of the positive electrode active material was doped with Fe) and Mn were calculated, so as to calculate the dissolution amount of Mn (and Fe doped at the Mn position) after cycling. The test standard was based on EPA-6010D-2014.

9. Test of Surface Oxygen Valence:

5 g of the sample of the positive electrode active material prepared above was taken and prepared into a button cell according to the above method for preparing button cell. The button cell was charged at a small rate of 0.05 C until the current decreased to 0.01 C. Then the positive electrode sheet in the button cell was taken out and soaked in dimethyl carbonate (DMC) for 8 hours. Then it was oven dried, scraped, and screened for particles having a particle diameter less than 500 nm. The resulting particles were measured by electron energy loss spectroscopy (EELS, the instrument model used was Talos F200S) to obtain the energy loss near-edge structure (ELNES), which reflects the state density and energy level distribution of elements. According to the state density and energy level distribution, the number of electrons occupied was calculated by integrating the data of state density of valence band, and then the valence state of surface oxygen after charging was calculated.

10. Measurement of Compaction Density:

5 g of the positive electrode active material powders prepared above were taken and placed in a special compaction mold (CARVER mold, USA, model 13 mm), and then the mold was placed on a compaction density instrument. A pressure of 3T was applied, the thickness of the powders under the pressure was read on the device (the thickness after pressure relief, the area of the container used for the test was 1540.25 mm$^2$), and the compaction density was calculated by $\rho=m/v$.

11. Test of the Crystallinities of Pyrophosphate and Phosphate by X-Ray Diffraction Method 5 g of the positive electrode active material powders prepared above were taken and measured for the total scattering intensity by X-ray, which was the sum of the scattering intensities of the materials throughout the space, and only related to the intensity of the primary ray, the chemical structure, and the total number of electrons participating in diffraction, that was, the mass, and independent of the state order of the sample; and then the crystalline scattering and amorphous scattering were separated from the diffraction pattern, and the crystallinity was the ratio of the crystalline scattering to the total scattering intensity.

12. Interplanar Spacing and Included Angle 1 g of each positive electrode active material powders prepared above were taken and placed in a 50 mL test tube, 10 mL of 75% alcohol (by mass fraction) was injected into the test tube, then sufficiently stirred and dispersed for 30 minutes, and then an appropriate amount of the above solution was taken by a clean disposable plastic pipette and dropped onto a 300-mesh copper mesh; at this time, part of the powders remained on the copper mesh, and the copper mesh together with the sample were transferred to a TEM (Talos F200s G2) sample cavity for testing, an original image of TEM test was obtained and the original image format (xx.dm3) was saved.

The original image obtained from the above TEM test was opened in DigitalMicrograph software, and Fourier transform was performed (which was automatically completed by the software after clicking operation) to obtain a diffraction pattern, the distance from a diffraction spot to the center position in the diffraction pattern was measured to obtain the interplanar spacing, and the included angle was obtained by calculation according to Bragg equation.

The above results are shown in Tables 2-5.

TABLE 2

Performance test results of Examples 1-1 to 1-33 and Comparative examples 1-7

| No. | Inner core | First coating layer | Second coating layer | Lattice change rate (%) | Li/Mn antisite defect concentration/% |
|---|---|---|---|---|---|
| Example 1-1 | Li$_{0.999}$Mn$_{0.60}$Fe$_{0.393}$V$_{0.004}$Co$_{0.003}$P$_{0.999}$S$_{0.001}$O$_4$ | 1% Li$_2$FeP$_2$O$_7$/ 3% LiFePO$_4$ | 2% carbon | 2.4 | 0.4 |
| Example 1-2 | Li$_{0.999}$Mn$_{0.60}$Fe$_{0.40}$P$_{0.999}$S$_{0.001}$O$_4$ | 0.8% Li$_2$FeP$_2$O$_7$/ 2.4% LiFePO$_4$ | 1% carbon | 6.6 | 1.2 |
| Examples 1-3 | Li$_{0.999}$Mn$_{0.60}$Fe$_{0.40}$P$_{0.999}$S$_{0.001}$O$_4$ | 1% Li$_2$FeP$_2$O$_7$/ 3% LiFePO$_4$ | 1% carbon | 6.5 | 1.1 |
| Examples 1-4 | Li$_{0.999}$Mn$_{0.60}$Fe$_{0.40}$P$_{0.999}$S$_{0.001}$O$_4$ | 1.2% Li$_2$FeP$_2$O$_7$/ 3.6% LiFePO$_4$ | 1% carbon | 6.5 | 0.8 |
| Example 1-5 | Li$_{0.999}$Mn$_{0.60}$Fe$_{0.40}$P$_{0.999}$S$_{0.001}$O$_4$ | 1.4% Li$_2$FeP$_2$O$_7$/ 4.2% LiFePO$_4$ | 1% carbon | 6.5 | 0.7 |
| Example 1-6 | Li$_{0.999}$Mn$_{0.60}$Fe$_{0.40}$P$_{0.999}$S$_{0.001}$O$_4$ | 1.6% Li$_2$FeP$_2$O$_7$/ 4.8% LiFePO$_4$ | 1% carbon | 6.6 | 0.6 |

TABLE 2-continued

Performance test results of Examples 1-1 to 1-33 and Comparative examples 1-7

| Example | Formula | Coating 1 | Coating 2 | Col 5 | Col 6 |
|---|---|---|---|---|---|
| Example 1-7 | $Li_{0.999}Mn_{0.60}Fe_{0.40}P_{0.999}S_{0.001}O_4$ | 1% $Li_2FeP_2O_7$/ 3% $LiFePO_4$ | 2% carbon | 6.5 | 1.0 |
| Example 1-8 | $Li_{0.999}Mn_{0.60}Fe_{0.40}P_{0.999}S_{0.001}O_4$ | 1% $Li_2FeP_2O_7$/ 3% $LiFePO_4$ | 4% carbon | 6.5 | 1.0 |
| Example 1-9 | $Li_{0.999}Mn_{0.60}Fe_{0.40}P_{0.999}S_{0.001}O_4$ | 1% $Li_2FeP_2O_7$/ 3% $LiFePO_4$ | 5% carbon | 6.4 | 1.1 |
| Example 1-10 | $Li_{0.999}Mn_{0.60}Fe_{0.40}P_{0.999}S_{0.001}O_4$ | 1% $Li_2FeP_2O_7$/ 3% $LiFePO_4$ | 6% carbon | 6.4 | 1.1 |
| Example 1-11 | $Li_{0.999}Mn_{0.60}Fe_{0.40}P_{0.999}S_{0.001}O_4$ | 1.5% $Li_2FeP_2O_7$/ 2.5% $LiFePO_4$ | 2% carbon | 6.5 | 1.1 |
| Example 1-12 | $Li_{0.999}Mn_{0.60}Fe_{0.40}P_{0.999}S_{0.001}O_4$ | 2% $Li_2FeP_2O_7$/ 2% $LiFePO_4$ | 2% carbon | 6.6 | 1.0 |
| Example 1-13 | $Li_{0.999}Mn_{0.60}Fe_{0.40}P_{0.999}S_{0.001}O_4$ | 2.5% $Li_2FeP_2O_7$/ 1.5% $LiFePO_4$ | 2% carbon | 6.7 | 1.2 |
| Example 1-14 | $Li_{0.999}Mn_{0.60}Fe_{0.40}P_{0.999}S_{0.001}O_4$ | 3% $Li_2FeP_2O_7$/ 1% $LiFePO_4$ | 2% carbon | 6.7 | 1.1 |
| Example 1-15 | $Li_{0.999}Mn_{0.60}Fe_{0.40}P_{0.999}S_{0.001}O_4$ | 3% $Li_2FeP_2O_7$/ 1% $LiFePO_4$ | 2% carbon | 7.5 | 2.5 |
| Example 1-16 | $Li_{0.993}Mn_{0.6}Ni_{0.393}Zn_{0.004}Ti_{0.003}P_{0.999}S_{0.001}O_4$ | 1% $Li_2FeP_2O_7$/ 3% $LiFePO_4$ | 2% carbon | 5.4 | 0.8 |
| Example 1-17 | $Li_{0.999}Mn_{0.60}Fe_{0.393}V_{0.007}P_{0.999}S_{0.001}O_4$ | 1% $Li_2FeP_2O_7$/ 3% $LiFePO_4$ | 2% carbon | 4.2 | 0.6 |
| Example 1-18 | $Li_{0.999}Mn_{0.60}Fe_{0.393}V_{0.004}Mg_{0.003}P_{0.999}S_{0.001}O_4$ | 1% $Li_2FeP_2O_7$/ 3% $LiFePO_4$ | 2% carbon | 2.6 | 0.5 |
| Example 1-19 | $LiMn_{0.60}Fe_{0.393}V_{0.004}Mg_{0.003}P_{0.999}N_{0.001}O_4$ | 1% $Li_2FeP_2O_7$/ 3% $LiFePO_4$ | 2% carbon | 2.3 | 0.5 |
| Example 1-20 | $Li_{1.001}Mn_{0.60}Fe_{0.393}V_{0.004}Mg_{0.003}P_{0.999}Si_{0.001}O_4$ | 1% $Li_2FeP_2O_7$/ 3% $LiFePO_4$ | 2% carbon | 2.4 | 0.7 |
| Example 1-21 | $Li_{1.001}Mn_{0.55}Fe_{0.40}V_{0.025}Mg_{0.025}P_{0.999}Si_{0.001}O_4$ | 1% $Li_2FeP_2O_7$/ 3% $LiFePO_4$ | 2% carbon | 2.2 | 0.5 |
| Example 1-22 | $Li_{1.001}Mn_{0.65}Fe_{0.25}V_{0.05}Mg_{0.05}P_{0.999}Si_{0.001}O_4$ | 1% $Li_2FeP_2O_7$/ 3% $LiFePO_4$ | 2% carbon | 2.5 | 0.8 |
| Example 1-23 | $Li_{1.004}Mn_{0.7}Fe_{0.2}V_{0.05}Mg_{0.05}P_{0.998}B_{0.002}O_4$ | 1% $Li_2FeP_2O_7$/ 3% $LiFePO_4$ | 2% carbon | 2.6 | 0.8 |
| Example 1-24 | $Li_{1.006}Mn_{0.75}Fe_{0.15}V_{0.05}Mg_{0.05}P_{0.997}B_{0.003}O_4$ | 1% $Li_2FeP_2O_7$/ 3% $LiFePO_4$ | 2% carbon | 2.6 | 0.8 |
| Example 1-25 | $Li_{1.002}Mn_{0.60}Fe_{0.393}V_{0.004}Mg_{0.003}P_{0.998}Si_{0.002}O_4$ | 1% $Li_2FeP_2O_7$/ 3% $LiFePO_4$ | 2% carbon | 2.3 | 0.7 |
| Example 1-26 | $Li_{0.997}Mn_{0.80}Fe_{0.194}V_{0.003}Mg_{0.003}P_{0.997}S_{0.003}O_4$ | 1% $Li_2FeP_2O_7$/ 3% $LiFePO_4$ | 2% carbon | 2.8 | 0.9 |
| Example 1-27 | $Li_{0.996}Mn_{0.60}Fe_{0.393}V_{0.004}Mg_{0.003}P_{0.996}S_{0.004}O_4$ | 1% $Li_2FeP_2O_7$/ 3% $LiFePO_4$ | 2% carbon | 2.2 | 0.6 |
| Example 1-28 | $Li_{0.995}Mn_{0.9}Fe_{0.094}V_{0.003}Mg_{0.003}P_{0.995}S_{0.005}O_4$ | 1% $Li_2FeP_2O_7$/ 3% $LiFePO_4$ | 2% carbon | 3.2 | 1.1 |
| Example 1-29 | $Li_{0.994}Mn_{0.90}Fe_{0.094}V_{0.003}Mg_{0.003}P_{0.994}S_{0.006}O_4$ | 1% $Li_2FeP_2O_7$/ 3% $LiFePO_4$ | 2% carbon | 3.0 | 1.2 |
| Example 1-30 | $Li_{0.993}Mn_{0.90}Fe_{0.094}V_{0.003}Mg_{0.003}P_{0.993}S_{0.007}O_4$ | 1% $Li_2FeP_2O_7$/ 3% $LiFePO_4$ | 2% carbon | 2.8 | 1.4 |
| Example 1-31 | $Li_{0.992}Mn_{0.90}Fe_{0.094}V_{0.003}Mg_{0.003}P_{0.992}S_{0.008}O_4$ | 1% $Li_2FeP_2O_7$/ 3% $LiFePO_4$ | 2% carbon | 2.6 | 1.4 |

TABLE 2-continued

Performance test results of Examples 1-1 to 1-33 and Comparative examples 1-7

| Example 1-32 | $Li_{0.991}Mn_{0.90}Fe_{0.094}V_{0.003}Mg_{0.003}P_{0.991}S_{0.009}O_4$ | 1% $Li_2FeP_2O_7$/ 3% $LiFePO_4$ | 2% carbon | 2.4 | 1.2 |
|---|---|---|---|---|---|
| Example 1-33 | $Li_{0.9}Mn_{0.90}Fe_{0.094}V_{0.003}Mg_{0.003}P_{0.9}S_{0.1}O_4$ | 1% $Li_2FeP_2O_7$/ 3% $LiFePO_4$ | 2% carbon | 2.1 | 0.9 |
| Comparative example 1 | $LiMnPO_4$ | — | 1% carbon | 11.4 | 3.2 |
| Comparative example 2 | $LiMn_{0.60}Fe_{0.40}PO_4$ | — | 1% carbon | 8.7 | 2.8 |
| Comparative example 3 | $Li_{0.999}MnP_{0.999}S_{0.001}O_4$ | — | 1% carbon | 9.8 | 2.5 |
| Comparative example 4 | $Li_{0.999}Mn_{0.60}Fe_{0.40}P_{0.999}S_{0.001}O_4$ | — | 1% carbon | 6.7 | 1.8 |
| Comparative example 5 | $Li_{0.999}Mn_{0.60}Fe_{0.40}P_{0.999}S_{0.001}O_4$ | 4% amorphous $Li_2FeP_2O_7$ | 1% carbon | 6.5 | 1.8 |
| Comparative example 6 | $Li_{0.999}Mn_{0.60}Fe_{0.40}P_{0.999}S_{0.001}O_4$ | 4% amorphous $LiFePO_4$ | 1% carbon | 6.6 | 1.8 |
| Comparative example 7 | $Li_{0.999}Mn_{0.60}Fe_{0.40}P_{0.999}S_{0.001}O_4$ | 1% amorphous $Li_2FeP_2O_7$ + 3% amorphous $LiFePO_4$ | 1% carbon | 6.6 | 1.8 |

| No. | Dissolution amount of Fe and Mn after cycling (ppm) | Surface oxygen valence | Compaction density (g/cm³) | Button cell gram capacity at 0.1 C (mAh/g) | Average discharge voltage of button cell (V) | Battery cell expansion after 30 days of storage at 60° C. (%) | Number of cycles corresponding to 80% capacity retention rate at 45° C. |
|---|---|---|---|---|---|---|---|
| Example 1-1 | 8 | −1.98 | 2.41 | 158.2 | 3.78 | 1.9 | 1328 |
| Example 1-2 | 63 | −1.97 | 2.43 | 148.9 | 3.75 | 6.4 | 804 |
| Examples 1-3 | 48 | −1.97 | 2.45 | 148.5 | 3.74 | 5.3 | 918 |
| Examples 1-4 | 32 | −1.97 | 2.44 | 147.3 | 3.73 | 4.8 | 968 |
| Example 1-5 | 20 | −1.98 | 2.45 | 146.8 | 3.73 | 3.6 | 1064 |
| Example 1-6 | 15 | −1.98 | 2.45 | 145.9 | 3.72 | 2.8 | 1189 |
| Example 1-7 | 42 | −1.97 | 2.46 | 147.5 | 3.73 | 4.8 | 968 |
| Example 1-8 | 38 | −1.97 | 2.47 | 146.4 | 3.73 | 4.3 | 1012 |
| Example 1-9 | 29 | −1.98 | 2.44 | 144.3 | 3.73 | 3.7 | 1108 |
| Example 1-10 | 18 | −1.98 | 2.41 | 142.1 | 3.73 | 2.8 | 1219 |
| Example 1-11 | 34 | −1.97 | 2.44 | 147.8 | 3.74 | 5.2 | 927 |
| Example 1-12 | 22 | −1.96 | 2.47 | 147.6 | 3.74 | 6.1 | 897 |
| Example 1-13 | 18 | −1.96 | 2.46 | 147.2 | 3.74 | 6.9 | 816 |
| Example 1-14 | 9 | −1.97 | 2.45 | 147.0 | 3.75 | 7.5 | 764 |
| Example 1-15 | 18 | −1.97 | 2.45 | 138.7 | 3.86 | 8.4 | 857 |
| Example 1-16 | 14 | −1.97 | 2.44 | 139.4 | 3.86 | 4.5 | 974 |
| Example 1-17 | 13 | −1.97 | 2.45 | 153.2 | 3.78 | 3.2 | 1241 |
| Example 1-18 | 10 | −1.97 | 2.45 | 155.6 | 3.80 | 2.7 | 1245 |
| Example 1-19 | 9 | −1.98 | 2.45 | 157.6 | 3.80 | 2.1 | 1349 |

TABLE 2-continued

Performance test results of Examples 1-1 to 1-33 and Comparative examples 1-7

| | | | | | | | |
|---|---|---|---|---|---|---|---|
| Example 1-20 | 11 | −1.98 | 2.44 | 157.4 | 3.80 | 2.4 | 1368 |
| Example 1-21 | 8 | −1.98 | 2.43 | 158.4 | 3.72 | 2.0 | 1459 |
| Example 1-22 | 12 | −1.98 | 2.42 | 156.9 | 3.83 | 2.8 | 1283 |
| Example 1-23 | 11 | −1.98 | 2.43 | 157.1 | 3.83 | 2.5 | 1268 |
| Example 1-24 | 10 | −1.98 | 2.44 | 157.4 | 3.83 | 2.6 | 1329 |
| Example 1-25 | 10 | −1.98 | 2.45 | 157.3 | 3.78 | 2.4 | 1369 |
| Example 1-26 | 12 | −1.98 | 2.45 | 156.1 | 3.85 | 2.9 | 1128 |
| Example 1-27 | 11 | −1.98 | 2.46 | 157.5 | 3.78 | 2.4 | 1394 |
| Example 1-28 | 13 | −1.96 | 2.45 | 156.8 | 3.89 | 3.2 | 1089 |
| Example 1-29 | 14 | −1.95 | 2.44 | 156.1 | 3.89 | 3.2 | 1038 |
| Example 1-30 | 16 | −1.95 | 2.45 | 155.8 | 3.89 | 3.1 | 948 |
| Example 1-31 | 17 | −1.94 | 2.44 | 155.4 | 3.89 | 3.0 | 917 |
| Example 1-32 | 18 | −1.94 | 2.45 | 154.8 | 3.89 | 2.8 | 897 |
| Example 1-33 | 20 | −1.94 | 2.44 | 154.5 | 3.89 | 2.7 | 879 |
| Comparative example 1 | 2060 | −1.55 | 1.81 | 125.6 | 4.02 | 48.6 | 185 |
| Comparative example 2 | 1597 | −1.76 | 1.92 | 134.8 | 3.76 | 42.5 | 358 |
| Comparative example 3 | 1895 | −1.66 | 1.88 | 128.6 | 4.05 | 45.5 | 267 |
| Comparative example 4 | 1279 | −1.83 | 1.82 | 140.5 | 3.78 | 38.5 | 417 |
| Comparative example 5 | 208 | −1.90 | 1.79 | 140.3 | 3.73 | 12.5 | 519 |
| Comparative example 6 | 318 | −1.91 | 1.83 | 140.2 | 3.74 | 11.5 | 528 |
| Comparative example 7 | 174 | −1.90 | 1.84 | 140.1 | 3.75 | 8.6 | 682 |

Comments:
1) The crystallinities of $Li_2FeP_2O_7$ and $LiFePO_4$ in Examples 1-1 to 1-33 were both 100%;
2) In Comparative examples 5-7, the crystallinity of $Li_2FeP_2O_7$ was 5%, and the crystallinity of $LiFePO_4$ was 8%.

Taken together, according to Examples 1-1 to 1-33 and Comparative examples 1-4, it can be seen that the presence of the first coating layer was favorable for reducing the Li/Mn antisite defect concentration and dissolution amount of Fe and Mn of the resulting material after cycling of the resulting material, increasing the button cell gram capacity of the battery, and improving the safety performance and cycling performance of the battery. When other elements were doped at the Mn position and the phosphorus position respectively, the lattice change rate, antisite defect concentration and dissolution amount of Fe and Mn of the resulting material could be significantly reduced, the gram capacity of the battery could be increased, and the safety performance and cycling performance of the battery could be improved.

Taken together, according to Examples 1-1 to 1-6, it can be seen that as the amount of the first coating layer increased from 3.2% to 6.4%, the Li/Mn antisite defect concentration of the resulting material gradually decreased, the dissolution amount of Fe and Mn after cycling gradually decreased, and the safety performance and cycling performance at 45° C. of the corresponding battery were also improved, but the button cell gram capacity decreased slightly. Optionally, when the total amount of the first coating layer was 4-5.6 wt %, the comprehensive performance of the corresponding battery was the best.

Taken together, according to Example 1-3 as well as Examples 1-7 to 1-10, it can be seen that as the amount of the second coating layer increased from 1% to 6%, the Li/Mn antisite defect concentration of the resulting material gradually decreased, the dissolution amount of Fe and Mn after cycling gradually decreased, and the safety performance and cycling performance at 45° C. of the corresponding battery were also improved, but the button cell gram capacity decreased slightly. Optionally, when the total amount of the second coating layer was 3-5 wt %, the comprehensive performance of the corresponding battery was the best.

Taken together, according to Examples 1-11 to 1-15 and Comparative examples 5-6, it can be seen that when both $Li_2FeP_2O_7$ and $LiFePO_4$ were present in the first coating layer, especially when the weight ratio of $Li_2FeP_2O_7$ to $LiFePO_4$ was 1:3 to 3:1, and particularly 1:3 to 1:1, the improvement in battery performance was more significant.

TABLE 3

Performance test results of Examples 2-1 to 2-4

| Example No. | First coating layer | Crystallinity of pyrophosphate and phosphate [1] | Lattice change rate (%) | Li/Mn antisite defect concentration/% | Dissolution amount of Fe and Mn after cycling (ppm) | Surface oxygen valence | Button cell capacity at 0.1 C (mAh/g) | Average discharge voltage of button cell (V) | Battery cell expansion after 30 days of storage at 60° C. (%) | Cycling capacity retention rate at 45° C. |
|---|---|---|---|---|---|---|---|---|---|---|
| Example 2-1 | 1% $Li_2FeP_2O_7$/3% $LiFePO_4$ | 30% | 6.3 | 1.9 | 147 | −1.88 | 145.2 | 3.72 | 5.6 | 698 |
| Example 2-2 | 1% $Li_2FeP_2O_7$/3% $LiFePO_4$ | 50% | 4.7 | 1.2 | 97 | −1.89 | 149.2 | 3.74 | 4.7 | 869 |
| Example 2-3 | 1% $Li_2FeP_2O_7$/3% $LiFePO_4$ | 70% | 3.5 | 0.8 | 29 | −1.91 | 151.3 | 3.75 | 3.8 | 1027 |
| Example 2-4 | 1% $Li_2FeP_2O_7$/3% $LiFePO_4$ | 100% | 2.4 | 0.4 | 8 | −1.98 | 158.2 | 3.79 | 1.9 | 1328 |

[1] Refers to the crystallinity of $Li_2FeP_2O_7$ and $LiFePO_4$ being 30%, 50%, 70%, and 100% respectively.

It can be seen from Table 3 that as the crystallinities of pyrophosphate and phosphate in the first coating layer gradually increased, the lattice change rate, Li/Mn antisite defect concentration and dissolution amount of Fe and Mn of the corresponding material gradually decreased, the button cell capacity of the battery gradually increased, and the safety performance and cycling performance of the battery also gradually improved.

TABLE 4

Performance test results of Examples 3-1 to 3-12

| Example No. | Doping element type and doping amount | Temperature in the reaction kettle/° C. | Stirring time/min | Lattice change rate (%) | Li/Mn antisite defect concentration/% |
|---|---|---|---|---|---|
| Example 3-1 | $Li_{0.999}Mn_{0.60}Fe_{0.393}V_{0.004}Co_{0.003}P_{0.999}S_{0.001}O_4$ | 60 | 120 | 5.6 | 2.4 |
| Example 3-2 | $Li_{0.999}Mn_{0.60}Fe_{0.393}V_{0.004}Co_{0.003}P_{0.999}S_{0.001}O_4$ | 70 | 120 | 4.8 | 1.9 |
| Example 3-3 | $Li_{0.999}Mn_{0.60}Fe_{0.393}V_{0.004}Co_{0.003}P_{0.999}S_{0.001}O_4$ | 80 | 120 | 3.7 | 1.3 |
| Example 3-4 | $Li_{0.999}Mn_{0.60}Fe_{0.393}V_{0.004}Co_{0.003}P_{0.999}S_{0.001}O_4$ | 90 | 120 | 2.9 | 1.1 |
| Example 3-5 | $Li_{0.999}Mn_{0.60}Fe_{0.393}V_{0.004}Co_{0.003}P_{0.999}S_{0.001}O_4$ | 100 | 120 | 2.5 | 0.5 |
| Example 3-6 | $Li_{0.999}Mn_{0.60}Fe_{0.393}V_{0.004}Co_{0.003}P_{0.999}S_{0.001}O_4$ | 110 | 120 | 2.8 | 1.2 |
| Example 3-7 | $Li_{0.999}Mn_{0.60}Fe_{0.393}V_{0.004}Co_{0.003}P_{0.999}S_{0.001}O_4$ | 120 | 120 | 3.7 | 2.1 |
| Example 3-8 | $Li_{0.999}Mn_{0.60}Fe_{0.393}V_{0.004}Co_{0.003}P_{0.999}S_{0.001}O_4$ | 130 | 120 | 4.5 | 3.4 |
| Example 3-9 | $Li_{0.999}Mn_{0.60}Fe_{0.393}V_{0.004}Co_{0.003}P_{0.999}S_{0.001}O_4$ | 100 | 60 | 4.9 | 3.1 |
| Example 3-10 | $Li_{0.999}Mn_{0.60}Fe_{0.393}V_{0.004}Co_{0.003}P_{0.999}S_{0.001}O_4$ | 100 | 90 | 4.1 | 2.5 |
| Example 3-11 | $Li_{0.999}Mn_{0.60}Fe_{0.393}V_{0.004}Co_{0.003}P_{0.999}S_{0.001}O_4$ | 100 | 150 | 3.5 | 1.1 |
| Example 3-12 | $Li_{0.999}Mn_{0.60}Fe_{0.393}V_{0.004}Co_{0.003}P_{0.999}S_{0.001}O_4$ | 100 | 180 | 2.5 | 0.5 |

| Example No. | Dissolution amount of Fe and Mn after cycling (ppm) | Surface oxygen valence | Button cell capacity at 0.1 C (mAh/g) | Average discharge voltage of button cell (V) | Battery cell expansion after 30 days of storage at 60° C. (%) | Number of cycles with 80% capacity retention rate at 45° C. |
|---|---|---|---|---|---|---|
| Example 3-1 | 49 | −1.98 | 155.2 | 3.67 | 5.6 | 1102 |
| Example 3-2 | 37 | −1.98 | 155.7 | 3.69 | 4.7 | 1203 |
| Example 3-3 | 28 | −1.98 | 156.4 | 3.72 | 3.8 | 1275 |

TABLE 4-continued

Performance test results of Examples 3-1 to 3-12

| | | | | | | |
|---|---|---|---|---|---|---|
| Example 3-4 | 17 | −1.98 | 157.8 | 3.75 | 3.1 | 1305 |
| Example 3-5 | 9 | −1.98 | 158.5 | 3.78 | 2.4 | 1327 |
| Example 3-6 | 19 | −1.98 | 156.7 | 3.73 | 3.6 | 1257 |
| Example 3-7 | 38 | −1.98 | 154.8 | 3.69 | 4.8 | 1179 |
| Example 3-8 | 46 | −1.98 | 153.7 | 3.64 | 6.3 | 986 |
| Example 3-9 | 38 | −1.98 | 155.4 | 3.76 | 4.9 | 1021 |
| Example 3-10 | 27 | −1.98 | 156.3 | 3.77 | 4.2 | 1097 |
| Example 3-11 | 15 | −1.98 | 157.8 | 3.79 | 3.1 | 1184 |
| Example 3-12 | 11 | −1.98 | 158.1 | 3.79 | 2.4 | 1297 |

Comment
1. The temperature in the reaction kettle and stirring time were parameters during the preparation of manganese oxalate doped with element A (that is, step (1)).

It can be seen from Table 4 that by adjusting the reaction temperature and reaction time in the reaction kettle during the preparation of manganese oxalate particles, various performances of the positive electrode material described in the present application could be further improved. For example, in the process of gradually increasing the reaction temperature from 60° C. to 130° C., the lattice change rate and Li/Mn antisite defect concentration first decreased and then increased, and the corresponding metal dissolution amount after cycling and safety performance also showed similar patterns, while the button cell capacity and cycling performance first increased and then decreased with the increase of temperature. Controlling the reaction temperature unchanged and adjusting the reaction time could also show a similar pattern.

TABLE 5

Performance test results of Examples 4-1 to 4-7 and Comparative examples 8-11

| No. | Li$_2$FeP$_2$O$_7$:LiFePO$_4$ (weight ratio) | Drying temperature (° C.) | Drying time (h) | Sintering temperature (° C.) | Sintering time (h) | Lattice spacing off pyrophosphate in the first coating layer (nm) | Included angle of pyrophosphate in the first coating layer (°) | Lattice spacing of phosphate in the first coating layer (nm) |
|---|---|---|---|---|---|---|---|---|
| Example 4-1 | 1:3 | 100 | 4 | 700 | 6 | 0.303 | 29.496 | 0.348 |
| Example 4-2 | 1:3 | 150 | 6 | 700 | 6 | 0.303 | 29.496 | 0.348 |
| Example 4-3 | 1:3 | 200 | 6 | 700 | 6 | 0.303 | 29.496 | 0.348 |
| Example 4-4 | 1:3 | 200 | 6 | 600 | 6 | 0.303 | 29.496 | 0.348 |
| Example 4-5 | 1:1 | 150 | 6 | 600 | 4 | 0.303 | 29.496 | 0.348 |
| Example 4-6 | 1:1 | 150 | 6 | 600 | 6 | 0.303 | 29.496 | 0.348 |
| Example 4-7 | 1:1 | 150 | 6 | 800 | 8 | 0.303 | 29.496 | 0.348 |
| Comparative example 8 | 1:3 | 80 | 3 | 400 | 3 | — | — | — |
| Comparative example 9 | 1:1 | 80 | 3 | 400 | 3 | — | — | — |
| Comparative example 10 | Li$_2$FeP$_2$O$_7$ alone | 80 | 3 | 350 | 2 | — | — | — |
| Comparative example 11 | LiFePO$_4$ alone | 80 | 3 | — | — | — | — | — |

TABLE 5-continued

Performance test results of Examples 4-1 to 4-7 and Comparative examples 8-11

| No. | Included angle of phosphate in the first coating layer (°) | Lattice change rate (%) | Li/Mn antisite defect concentration/% | Surface oxygen valence | Button cell capacity at 0.1 C (mAh/g) | Average discharge voltage of button cell (V) | Battery cell expansion after 30 days of storage at 60° C. (%) | Number of cycles with 80% capacity retention rate at 45° C. |
|---|---|---|---|---|---|---|---|---|
| Example 4-1 | 25.562 | 2.9 | 0.6 | −1.97 | 155.4 | 3.71 | 3.4 | 1183 |
| Example 4-2 | 25.562 | 2.6 | 0.6 | −1.98 | 157.8 | 3.78 | 2.4 | 1347 |
| Example 4-3 | 25.562 | 2.7 | 0.6 | −1.98 | 156.5 | 3.73 | 3.1 | 1277 |
| Example 4-4 | 25.562 | 2.9 | 1.1 | −1.95 | 153.8 | 3.69 | 3.9 | 984 |
| Example 4-5 | 25.562 | 2.8 | 1.2 | −1.94 | 155.5 | 3.71 | 3.5 | 895 |
| Example 4-6 | 25.562 | 2.6 | 0.8 | −1.95 | 156.3 | 3.72 | 3.1 | 963 |
| Example 4-7 | 25.562 | 2.5 | 0.4 | −1.97 | 156.9 | 3.74 | 2.7 | 1043 |
| Comparative example 8 | — | 3.9 | 1.8 | −1.91 | 148.0 | 3.67 | 9.4 | 779 |
| Comparative example 9 | — | 3.6 | 1.6 | −1.93 | 149.4 | 3.70 | 6.8 | 683 |
| Comparative example 10 | — | 3.7 | 1.7 | −1.86 | 147.5 | 3.68 | 11.5 | 385 |
| Comparative example 11 | — | 3.4 | 1.4 | −1.93 | 150.3 | 3.72 | 4.7 | 526 |

It can be seen from Table 5 that when preparing lithium iron pyrophosphate by the method of the present application, by adjusting the drying temperature/time and sintering temperature/time in the preparation process, the performance of the resulting material could be improved, thereby improving the battery performance. It can be seen from Comparative examples 8-11 that when the drying temperature was lower than 100° C. or the temperature of the sintering step was lower than 400° C. during the preparation of lithium iron pyrophosphate. $Li_2FeP_2O_7$ desired by the present application could not be obtained, so that the material performance and the performance of the battery comprising the resulting material could not be improved.

Test of Battery

Secondary batteries prepared with the positive electrode sheets P1-P42 were tested as follows.

(1) The energy density and furnace temperature test results of the secondary battery were measured according to the method in the national standard GB 38031-2020 "Safety Requirements for power storage batteries for electric vehicles";

(2) Needle piercing test: the secondary battery was fully charged to 100% SOC, and the battery cell was pierced with a Φ8 mm steel needle at a speed of 25 mm/2, and observed for 1 h. If there was no fire, the test was passed;

(3) According to the national standard GBT31486-2015 "Electrical performance requirements and test methods of power storage batteries for electric vehicles", the room temperature 1 C rate charge capacity retention rate and low temperature discharge capacity retention rate of the secondary battery were measured to obtain the dynamic performance data of the battery cell;

(4) According to the national standard GBT31484-2015 "Cycle life requirements and test methods of power storage batteries for electric vehicles", the cycle life data of the secondary battery were tested.

The above results are shown in Table 6.

TABLE 6

| | Battery test results | | | | | | | |
|---|---|---|---|---|---|---|---|---|
| Positive electrode sheet for battery cell | Energy density (Wh/L) | | Energy density (Wh/kg) | | Furnace temperature experiment | Needle piercing experiment | Room temperature 1 C charge capacity retention rate (Vs 0.33 C) | Cycle life, cycles (80% SOH, 25° C.) | Discharge capacity retention rate at −20° C. and 0.33 C |
| Positive electrode sheet P1 | 431.4 | BASE | 191.3 | BASE | PASS | PASS | 84% | 3000 | 70% |
| Positive electrode sheet P2 | 567.7 | ↑32% | 228.5 | ↑19% | Ignite | Ignite | 100% | 2000 | 80% |

TABLE 6-continued

Battery test results

| Positive electrode sheet for battery cell | Energy density (Wh/L) | | Energy density (Wh/kg) | | Furnace temperature experiment | Needle piercing experiment | Room temperature 1 C charge capacity retention rate (Vs 0.33 C) | Cycle life, cycles (80% SOH, 25° C.) | Discharge capacity retention rate at −20° C. and 0.33 C |
|---|---|---|---|---|---|---|---|---|---|
| Positive electrode sheet P3 | 476.7 | ↑10% | 209.8 | ↑10% | PASS | PASS | 92% | 2440 | 76% |
| Positive electrode sheet P4 | 508.6 | ↑18% | 212.8 | ↑11% | PASS | PASS | 91% | 2530 | 74% |
| Positive electrode sheet P5 | 454.4 | ↑5% | 200.6 | ↑5% | PASS | PASS | 86% | 2880 | 74% |
| Positive electrode sheet P6 | 526.7 | ↑22% | 215.8 | ↑13% | PASS | PASS | 96% | 2400 | 78% |
| Positive electrode sheet P7 | 476.7 | ↑10% | 209.8 | ↑10% | PASS | PASS | 93% | 2520 | 74% |
| Positive electrode sheet P8 | 476.7 | ↑10% | 209.8 | ↑10% | PASS | PASS | 92% | 2440 | 74% |
| Positive electrode sheet P9 | 454.4 | ↑5% | 200.6 | ↑5% | PASS | PASS | 88% | 2550 | 75% |
| Positive electrode sheet P10 | 467.4 | ↑8% | 201.3 | ↑5% | PASS | PASS | 88% | 2680 | 72% |
| Positive electrode sheet P11 | 526.7 | ↑22% | 215.8 | ↑13% | PASS | PASS | 98% | 2030 | 77% |
| Positive electrode sheet P12 | 526.7 | ↑22% | 215.8 | ↑13% | PASS | PASS | 97% | 2170 | 78% |
| Positive electrode sheet P13 | 454.4 | ↑5% | 200.6 | ↑5% | PASS | PASS | 87% | 2850 | 76% |
| Positive electrode sheet P14 | 456.1 | ↑6% | 200.7 | ↑5% | PASS | PASS | 96% | 2310 | 78% |
| Positive electrode sheet P15 | 476.7 | ↑10% | 209.8 | ↑10% | PASS | PASS | 94% | 2510 | 75% |
| Positive electrode sheet P16 | 454.4 | ↑5% | 200.6 | ↑5% | PASS | PASS | 87% | 2740 | 72% |
| Positive electrode sheet P17 | 526.7 | ↑22% | 215.8 | ↑13% | PASS | PASS | 95% | 2210 | 79% |
| Positive electrode sheet P18 | 508.6 | ↑18% | 212.8 | ↑11% | PASS | PASS | 94% | 2620 | 74% |
| Positive electrode sheet P19 | 445.4 | ↑3% | 196.9 | ↑3% | PASS | PASS | 85% | 2910 | 72% |
| Positive electrode sheet P20 | 479.4 | ↑11% | 210.9 | ↑10% | PASS | PASS | 94% | 2370 | 80% |
| Positive electrode sheet P21 | 462.0 | ↑7% | 204.0 | ↑7% | PASS | PASS | 92% | 2590 | 71% |
| Positive electrode sheet P22 | 445.4 | ↑3% | 196.9 | ↑3% | PASS | PASS | 85% | 2850 | 71% |
| Positive electrode sheet P23 | 511.4 | ↑19% | 212.2 | ↑11% | PASS | PASS | 94% | 2360 | 76% |
| Positive electrode sheet P24 | 481.9 | ↑12% | 204.8 | ↑7% | PASS | PASS | 90% | 2640 | 75% |

TABLE 6-continued

Battery test results

| Positive electrode sheet for battery cell | Energy density (Wh/L) | | Energy density (Wh/kg) | | Furnace temperature experiment | Needle piercing experiment | Room temperature 1 C charge capacity retention rate (Vs 0.33 C) | Cycle life, cycles (80% SOH, 25° C.) | Discharge capacity retention rate at −20° C. and 0.33 C |
|---|---|---|---|---|---|---|---|---|---|
| Positive electrode sheet P25 | 462.0 | ↑7% | 204.0 | ↑7% | PASS | PASS | 89% | 2700 | 75% |
| Positive electrode sheet P26 | 540.6 | ↑25% | 219.2 | ↑15% | PASS | PASS | 98% | 2190 | 77% |
| Positive electrode sheet P27 | 511.4 | ↑19% | 212.2 | ↑11% | PASS | PASS | 94% | 2390 | 76% |
| Positive electrode sheet P28 | 462.0 | ↑7% | 204.0 | ↑7% | PASS | PASS | 91% | 2620 | 75% |
| Positive electrode sheet P29 | 540.6 | ↑25% | 219.2 | ↑15% | PASS | PASS | 99% | 2280 | 78% |
| Positive electrode sheet P30 | 511.4 | ↑19% | 212.2 | ↑11% | PASS | PASS | 95% | 2280 | 76% |
| Positive electrode sheet P31 | 567.7 | ↑32% | 228.5 | ↑19% | Ignite | Ignite | 100% | 2100 | 80% |
| Positive electrode sheet P32 | 567.7 | ↑32% | 228.5 | ↑19% | Ignite | Ignite | 100% | 1600 | 80% |
| Positive electrode sheet P33 | 567.7 | ↑32% | 228.5 | ↑19% | Ignite | Ignite | 100% | 1500 | 79% |
| Positive electrode sheet P34 | 567.7 | ↑32% | 228.5 | ↑19% | Ignite | Ignite | 100% | 1300 | 80% |
| Positive electrode sheet P35 | 567.7 | ↑32% | 228.5 | ↑19% | Ignite | Ignite | 100% | 1100 | 80% |
| Positive electrode sheet P36 | 567.7 | ↑32% | 228 | ↑19% | Ignite | Ignite | 100% | 1000 | 79% |
| Positive electrode sheet P37 | 508.6 | ↑18% | 212.8 | ↑11% | PASS | PASS | 94% | 2400 | 75% |
| Positive electrode sheet P38 | 508.6 | ↑18% | 212.8 | ↑11% | PASS | PASS | 92% | 2160 | 75% |
| Positive electrode sheet P39 | 508.6 | ↑18% | 212.8 | ↑11% | PASS | PASS | 92% | 2140 | 75% |
| Positive electrode sheet P40 | 508.6 | ↑18% | 212.8 | ↑11% | PASS | PASS | 91% | 2140 | 75% |
| Positive electrode sheet P41 | 508.6 | ↑18% | 212.8 | ↑11% | PASS | PASS | 90% | 2070 | 75% |
| Positive electrode sheet P42 | 508.6 | ↑18% | 212.8 | ↑11% | PASS | PASS | 92% | 1820 | 75% |

According to the above results, it can be seen that:

Compared with the secondary battery using the positive electrode sheet P1, the secondary batteries using the positive electrode sheets P3-P30 and P37-P42 had higher energy density, higher room temperature rate charge capacity retention rate and higher low temperature discharge capacity retention rate, and successfully passed the furnace temperature experiment and needle piercing test. In comparison with the secondary batteries using the positive electrode sheets P3-P30, the secondary battery using the positive electrode sheet P2 failed to pass the furnace temperature experiment and needle piercing test, and an ignition occurred during the test. The secondary batteries using the positive electrode sheets P3-P30 had a longer cycle life than the secondary battery using the positive electrode sheet P2. In comparison with the secondary batteries using the positive electrode sheets P37-P42, the secondary batteries using the positive electrode sheets P31-P36 failed to pass the furnace temperature experiment and needle piercing test, and an ignition occurred during the test. The positive electrode sheets P37-P42 comprised a first positive electrode active material and a second positive electrode active material, and the positive electrode sheets P31-P36 comprised an equal amount of the second positive electrode active material corresponding thereto. It can be seen that the cycle life of a secondary battery using a positive electrode sheet comprising the first positive electrode active material and the second positive electrode active material was longer than that of a secondary battery using a positive electrode sheet comprising only the second positive electrode active material.

As described above, the secondary battery prepared with the positive electrode sheet of the present application has higher energy density, higher battery cell rate performance, better dynamic performance and low temperature performance, longer cycle life, and higher safety.

It should be noted that the present application is not limited to the above embodiments. The above embodiments are merely exemplary, and embodiments having substantially the same technical idea and the same effects within the scope of the technical solutions of the present application are all included in the technical scope of the present application. In addition, without departing from the scope of the subject matter of the present application, various modifications that can be conceived by those skilled in the art are applied to the embodiments, and other modes constructed by combining some of the constituent elements of the embodiments are also included in the scope of the present application.

The invention claimed is:

1. A positive electrode sheet, comprising a positive electrode current collector and a positive electrode film layer provided on at least one surface of the positive electrode current collector; the positive electrode film layer is of a single-layer structure or a multi-layer structure; when the positive electrode film layer is of a single-layer structure, at least one of the positive electrode film layers comprises both a first positive electrode active material having a core-shell structure and a second positive electrode active material; and/or, when the positive electrode film layer is of a multi-layer structure, at least one layer of at least one of the positive electrode film layers comprises both a first positive electrode active material having a core-shell structure and a second positive electrode active material;

the first positive electrode active material comprises an inner core, a first coating layer covering the inner core and a second coating layer covering the first coating layer; wherein the inner core comprises $Li_{1+x}Mn_{1-y}A_yP_{1-z}R_zO_4$, the first coating layer comprises pyrophosphate $MP_2O_7$ and phosphate $XPO_4$, and the second coating layer comprises carbon element;

wherein,

A is selected from one or more elements of Zn, Al, Na, K, Mg, Mo, W, Ti, V, Zr, Fe, Ni, Co, Ga, Sn, Sb, Nb and Ge;

R is selected from one or more elements of B, Si, N and S;

x is selected from any value in the range of −0.100-0.100;

y is selected from any value in the range of 0.001-0.500;

z is selected from any value in the range of 0.001-0.100;

M and X are independently selected from one or more elements of Li, Fe, Ni, Mg, Co, Cu, Zn, Ti, Ag, Zr, Nb and Al; and the second positive electrode active material is selected from one or more of $LiNi_aCo_bMn_{(1-a-b)}O_2$, $LiNi_aCo_bAl_{(1-a-b)}O_2$ and $LiCoO_2$; wherein a is independently selected from any value in the range of 0.3-0.9, and the sum of a and b is independently selected from any value in the range of 0.3-0.9.

2. A positive electrode sheet, comprising a positive electrode current collector and a positive electrode film layer provided on at least one surface of the positive electrode current collector; at least one of the positive electrode film layers is of a multi-layer structure, and any positive electrode film layer having a multi-layer structure respectively comprises a first positive electrode active material having a core-shell structure and a second positive electrode active material in different layers;

the first positive electrode active material comprises an inner core, a first coating layer covering the inner core and a second coating layer covering the first coating layer; wherein the inner core comprises $Li_{1+x}Mn_{1-y}A_yP_{1-z}R_zO_4$, the first coating layer comprises pyrophosphate $MP_2O_7$ and phosphate $XPO_4$, and the second coating layer comprises carbon element;

wherein,

A is selected from one or more elements of Zn, Al, Na, K, Mg, Mo, W, Ti, V, Zr, Fe, Ni, Co, Ga, Sn, Sb, Nb and Ge;

R is selected from one or more elements of B, Si, N and S;

x is selected from −0.100-0.100;

y is selected from 0.001-0.500;

z is selected from 0.001-0.100;

M and X are independently selected from one or more elements of Li, Fe, Ni, Mg, Co, Cu, Zn, Ti, Ag, Zr, Nb and Al;

the second positive electrode active material is selected from one or more of $LiNi_aCo_bMn_{(1-a-b)}O_2$, $LiNi_aCo_bAl_{(1-a-b)}O_2$ and $LiCoO_2$; wherein a is independently selected from any value in the range of 0.3-0.9, and the sum of a and b is independently selected from any value in the range of 0.3-0.9; and optionally, any of the positive electrode film layers having a multi-layer structure respectively comprises the first positive electrode active material and the second positive electrode active material in adjacent layers.

3. A positive electrode sheet, comprising a positive electrode current collector as well as a positive electrode film layer A and a positive electrode film layer B respectively provided on both surfaces of the positive electrode current collector; the positive electrode film layer A and the positive electrode film layer B are each independently of a single-layer structure or a multi-layer structure; at least one layer of the positive electrode film layer A comprises a first positive electrode active material having a core-shell structure, while at least one layer of the positive electrode film layer B comprises a second positive electrode active material;

the first positive electrode active material comprises an inner core, a first coating layer covering the inner core and a second coating layer covering the first coating layer; wherein the inner core comprises $Li_{1+x}Mn_{1-y}A_yP_{1-z}R_zO_4$, the first coating layer comprises pyrophosphate $MP_2O_7$ and phosphate $XPO_4$, and the second coating layer comprises carbon element;

wherein,

A is selected from one or more elements of Zn, Al, Na, K, Mg, Mo, W, Ti, V, Zr, Fe, Ni, Co, Ga, Sn, Sb, Nb and Ge;

R is selected from one or more elements of B, Si, N and S;

x is selected from −0.100-0.100;

y is selected from 0.001-0.500;

z is selected from 0.001-0.100;

M and X are independently selected from one or more elements of Li, Fe, Ni, Mg, Co, Cu, Zn, Ti, Ag, Zr, Nb and Al; and the second positive electrode active material is selected from one or more of $LiNi_aCo_bMn_{(1-a-b)}O_2$, $LiNi_aCo_bAl_{(1-a-b)}O_2$ and $LiCoO_2$; wherein a is independently selected from any value in the range of 0.3-0.9, and the sum of a and b is independently selected from any value in the range of 0.3-0.9.

4. The positive electrode sheet according to claim 1, wherein the mass ratio of the first active material to the second active material is 1:7-7:1.

5. The positive electrode sheet according to claim 1, wherein in the first positive electrode active material,
- A is selected from one or more elements of Zn, Fe, Ti, V, Ni, Co and Mg; and/or,
- A is selected from at least two elements of Fe, Ti, V, Ni, Co and Mg; and/or,
- x is selected from any value in the range of −0.100-0.006; and/or,
- y is selected from any value in the range of 0.1-0.4; and/or,
- M and X are independently selected from one or more elements of Li and Fe; and/or,
- the ratio of y to 1−y is selected from 1:10 to 10:1; and/or,
- the ratio of z to 1−z is selected from 1:999 to 1:9.

6. The positive electrode sheet according to claim 1, wherein in the first positive electrode active material, the phosphate in the first coating layer has an interplanar spacing of 0.345-0.358 nm and an included angle of crystallographic direction (111) of 24.25°-26.45°; and the pyrophosphate in the first coating layer has an interplanar spacing of 0.293-0.326 nm and an included angle of crystallographic direction (111) of 26.41°-32.57°.

7. The positive electrode sheet according to claim 1, wherein in the first positive electrode active material, the coating amount of the first coating layer is greater than 0 wt % and less than or equal to 7 wt % based on the weight of the inner core.

8. The positive electrode sheet according to claim 1, wherein in the first positive electrode active material, the weight ratio of the pyrophosphate to phosphate in the first coating layer is 1:3 to 3:1.

9. The positive electrode sheet according to claim 1, wherein in the first positive electrode active material, the crystallinities of the pyrophosphate and phosphate are each independently 10% to 100%.

10. The positive electrode sheet according to claim 1, wherein in the first positive electrode active material, the coating amount of the second coating layer is greater than 0 wt % and less than or equal to 6 wt % based on the weight of the inner core.

11. The positive electrode sheet according to claim 1, wherein the concentration of Li/Mn antisite defects in the first positive electrode active material is 4% or less.

12. The positive electrode sheet according to claim 1, wherein the lattice change rate of the first positive electrode active material is 6% or less.

13. The positive electrode sheet according to claim 1, wherein the surface oxygen valence state of the first positive electrode active material is −1.88 or less.

14. The positive electrode sheet according to claim 1, wherein the compaction density of the first positive electrode active material at 3 tons (T) is 2.0 g/cm$^3$ or more.

15. The positive electrode sheet according to claim 1, wherein the sum of the masses of the first positive electrode active material and the second positive electrode active material accounts for 88%-98.7% of the mass of the positive electrode sheet.

16. A secondary battery, comprising the positive electrode sheet according to claim 1.

17. A battery module, comprising the secondary battery according to claim 16.

18. A battery pack, comprising the battery module according to claim 17.

19. An electrical apparatus, comprising the battery pack according to claim 18.

* * * * *